United States Patent
Mathew et al.

(10) Patent No.: US 10,395,035 B2
(45) Date of Patent: Aug. 27, 2019

(54) PHOTON EMISSION ATTACK RESISTANCE DRIVER CIRCUITS

(71) Applicant: Intel Corporation, Santa Clara, CA (US)

(72) Inventors: Sanu K. Mathew, Hillsboro, OR (US); Sudhir K Satpathy, Hillsboro, OR (US); Vikram B Suresh, Hillsboro, OR (US); Patrick Koeberl, Alsbach-Haenlein (DE)

(73) Assignee: Intel Corporation, Santa Clara, CA (US)

( * ) Notice: Subject to any disclaimer, the term of this patent is extended or adjusted under 35 U.S.C. 154(b) by 234 days.

(21) Appl. No.: 15/277,195

(22) Filed: Sep. 27, 2016

(65) Prior Publication Data

US 2018/0089433 A1  Mar. 29, 2018

(51) Int. Cl.
| | |
|---|---|
| *H01L 27/02* | (2006.01) |
| *G06F 21/56* | (2013.01) |
| *G06F 21/72* | (2013.01) |
| *G06F 21/75* | (2013.01) |
| *H01L 23/00* | (2006.01) |

(52) U.S. Cl.
CPC ............ *G06F 21/567* (2013.01); *G06F 21/72* (2013.01); *G06F 21/75* (2013.01); *H01L 27/0207* (2013.01); *H01L 23/573* (2013.01)

(58) Field of Classification Search
None
See application file for complete search history.

(56) References Cited

U.S. PATENT DOCUMENTS

| | | | |
|---|---|---|---|
| 6,049,477 A | 4/2000 | Taira | |
| 2008/0111598 A1* | 5/2008 | Yanagigawa | G11C 5/145 327/157 |
| 2010/0129971 A1 | 5/2010 | Ohta et al. | |
| 2011/0234307 A1 | 9/2011 | Marinet et al. | |
| 2013/0326632 A1 | 12/2013 | Shen-Orr et al. | |
| 2014/0143883 A1 | 5/2014 | Shen-Orr et al. | |

FOREIGN PATENT DOCUMENTS

WO   2018063715   4/2018

OTHER PUBLICATIONS

"International Application Serial No. PCT/US2017/049386, International Search Report dated Dec. 13, 2017", 4 pgs.
"International Application Serial No. PCT/US2017/049386, Written Opinion dated Dec. 13, 2017", 9 pgs.

* cited by examiner

*Primary Examiner* — Mounir S Amer
(74) *Attorney, Agent, or Firm* — Schwegman Lundberg & Woessner, P.A.

(57) ABSTRACT

Some embodiments include apparatuses having diffusion regions located adjacent each other in a substrate, and connections coupled to the diffusion regions. The diffusion regions include first diffusion regions, second diffusion regions, and third diffusion regions. One of the second diffusion regions and one of the third diffusion regions are between two of the first diffusion regions. One of the first diffusion regions and one of the third diffusion regions are between two of the second diffusion regions. The connections include a first connection coupled to each of the first diffusion regions, a second connection coupled to each of the second diffusion regions, and a third connection coupled to each of the third diffusion regions.

19 Claims, 12 Drawing Sheets

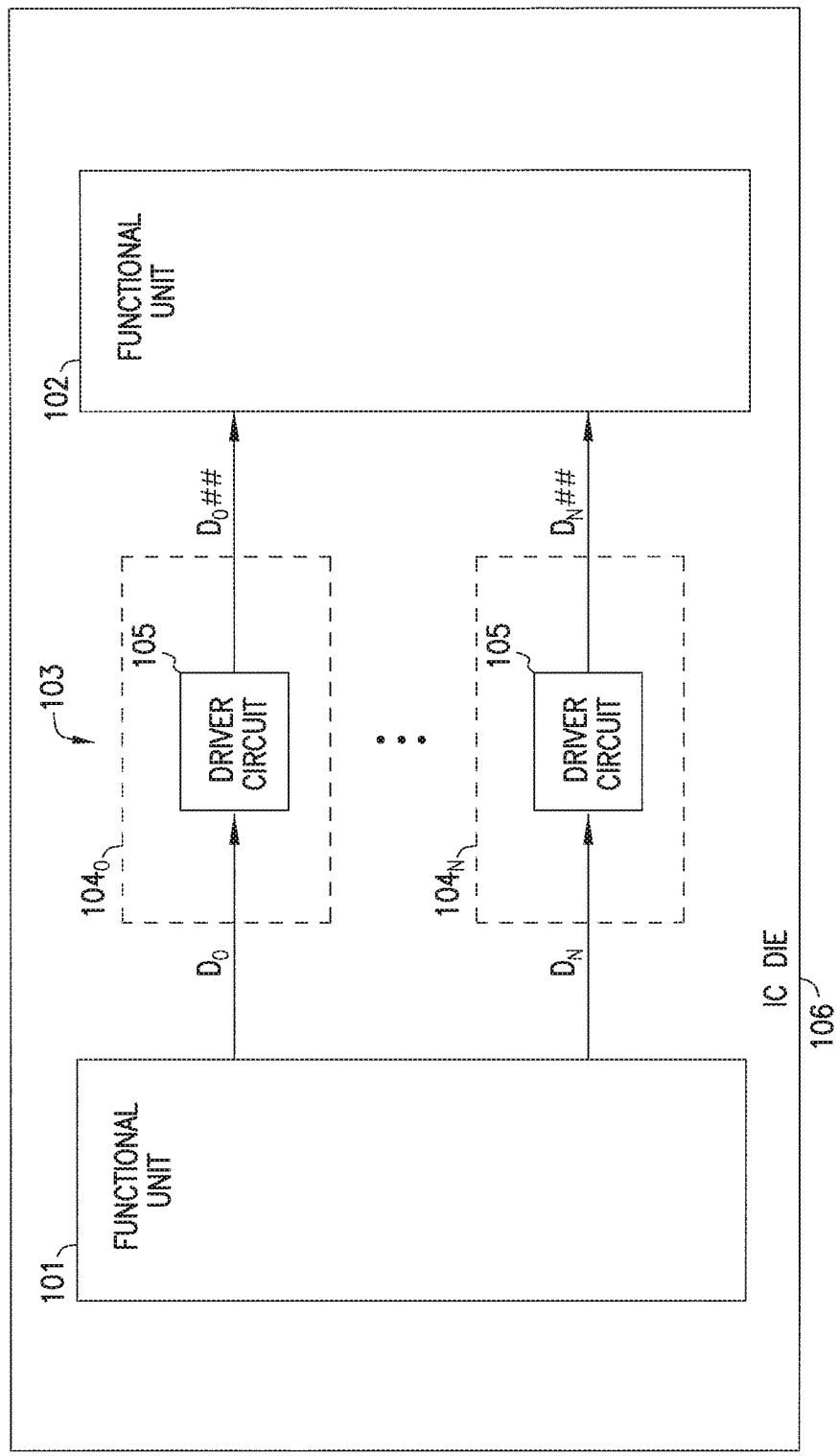

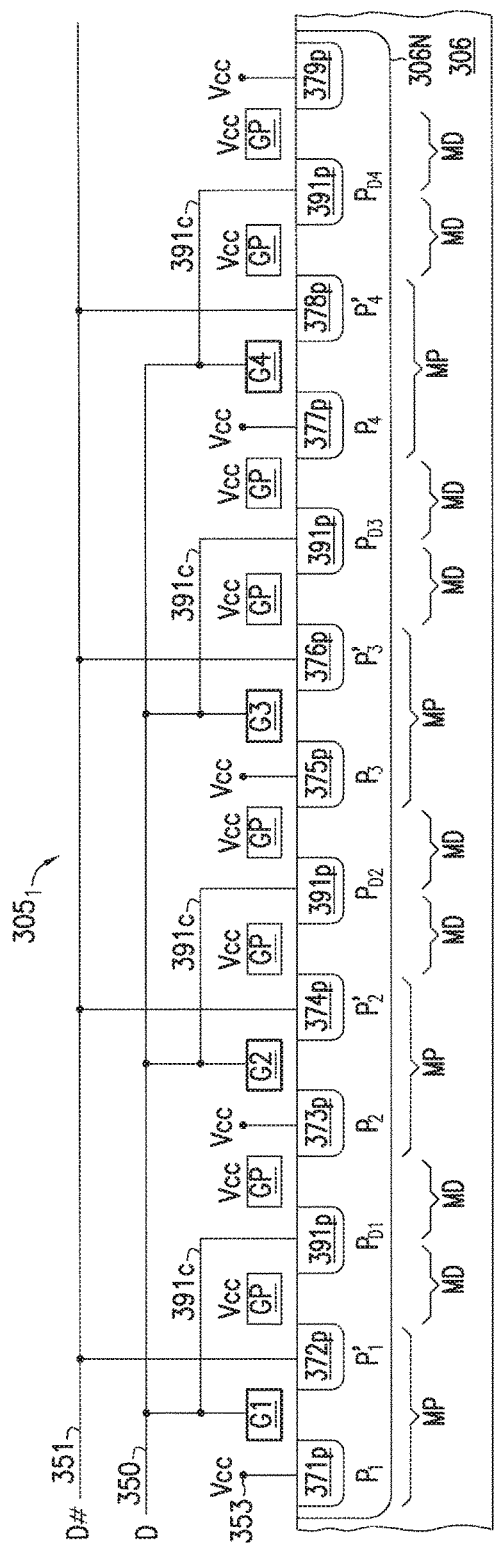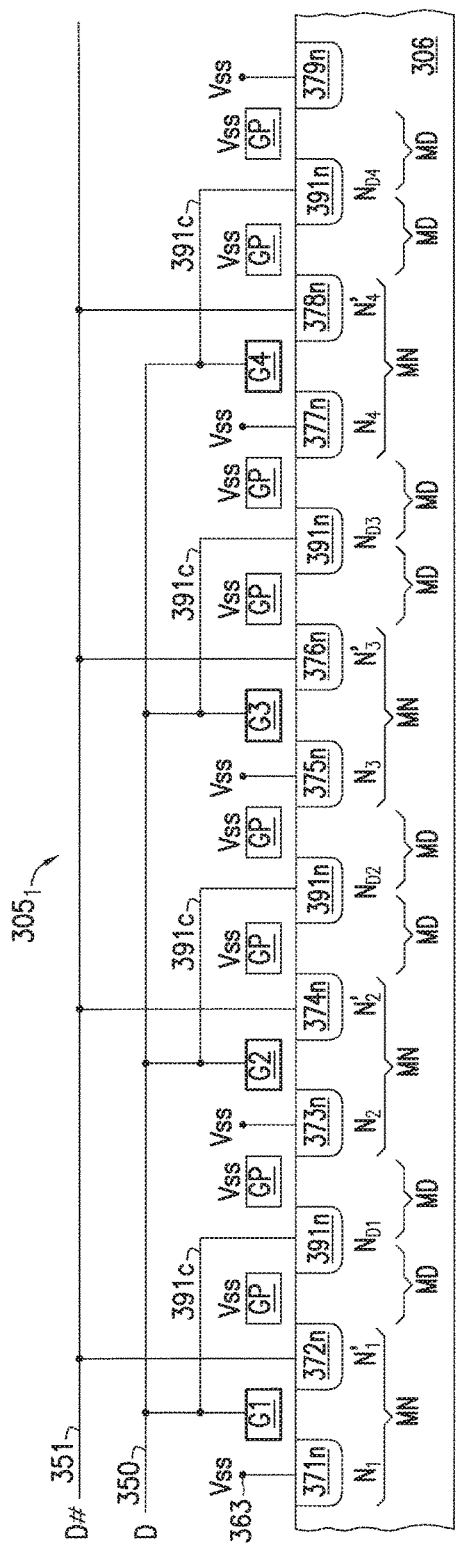
FIG. 3D
FIG. 3E

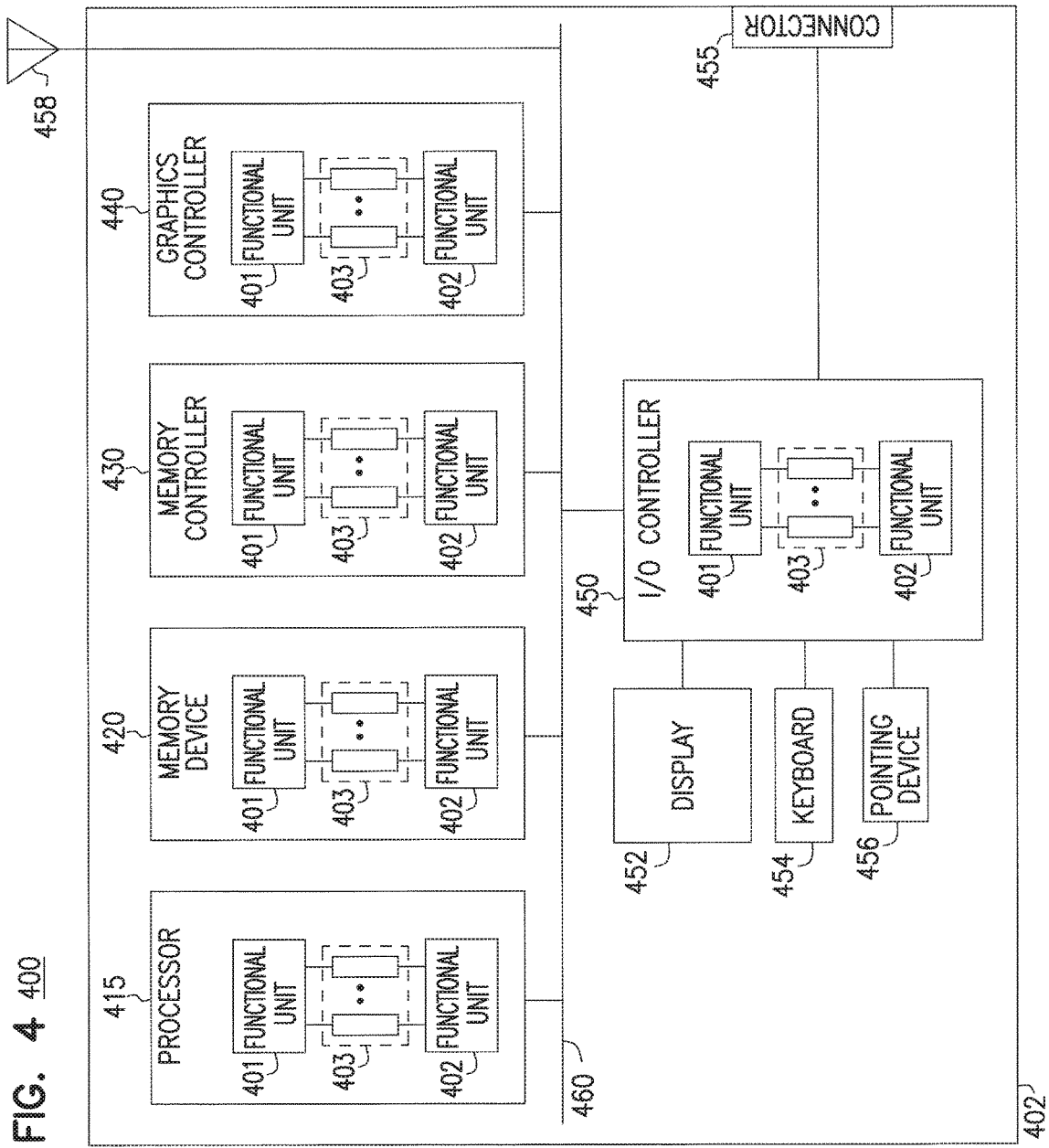

US 10,395,035 B2

PHOTON EMISSION ATTACK RESISTANCE DRIVER CIRCUITS

TECHNICAL FIELD

Embodiments described herein pertain to protection against side-channel attacks including photonic emission attacks in electronic devices and systems. Some embodiments relate to driver circuits in such devices and systems.

BACKGROUND

Many electronic systems and devices, such as integrated circuit (IC) chips, emit photons when they operate. Analysis of photon emissions from a device may lead to reconstruction of confidential information contained in or used by the device. Thus, confidential information in a device or system may be compromised by photonic emission attacks if the device or system has an inadequate protection against such photonic emission attacks.

BRIEF DESCRIPTION OF THE DRAWINGS

FIG. 1 shows an apparatus in the form of a device including functional units, and a bus between the functional units, according to some embodiments described herein.

FIG. 3C, FIG. 3D, and FIG. 3E show a top view (e.g., layout) and cross-sectional views of a portion of the driver circuit of FIG. 3B, according to some embodiments described herein.

FIG. 4 shows an apparatus in the form of a system (e.g., electronic system), according to some embodiments described herein.

DETAILED DESCRIPTION

Figure 2A:
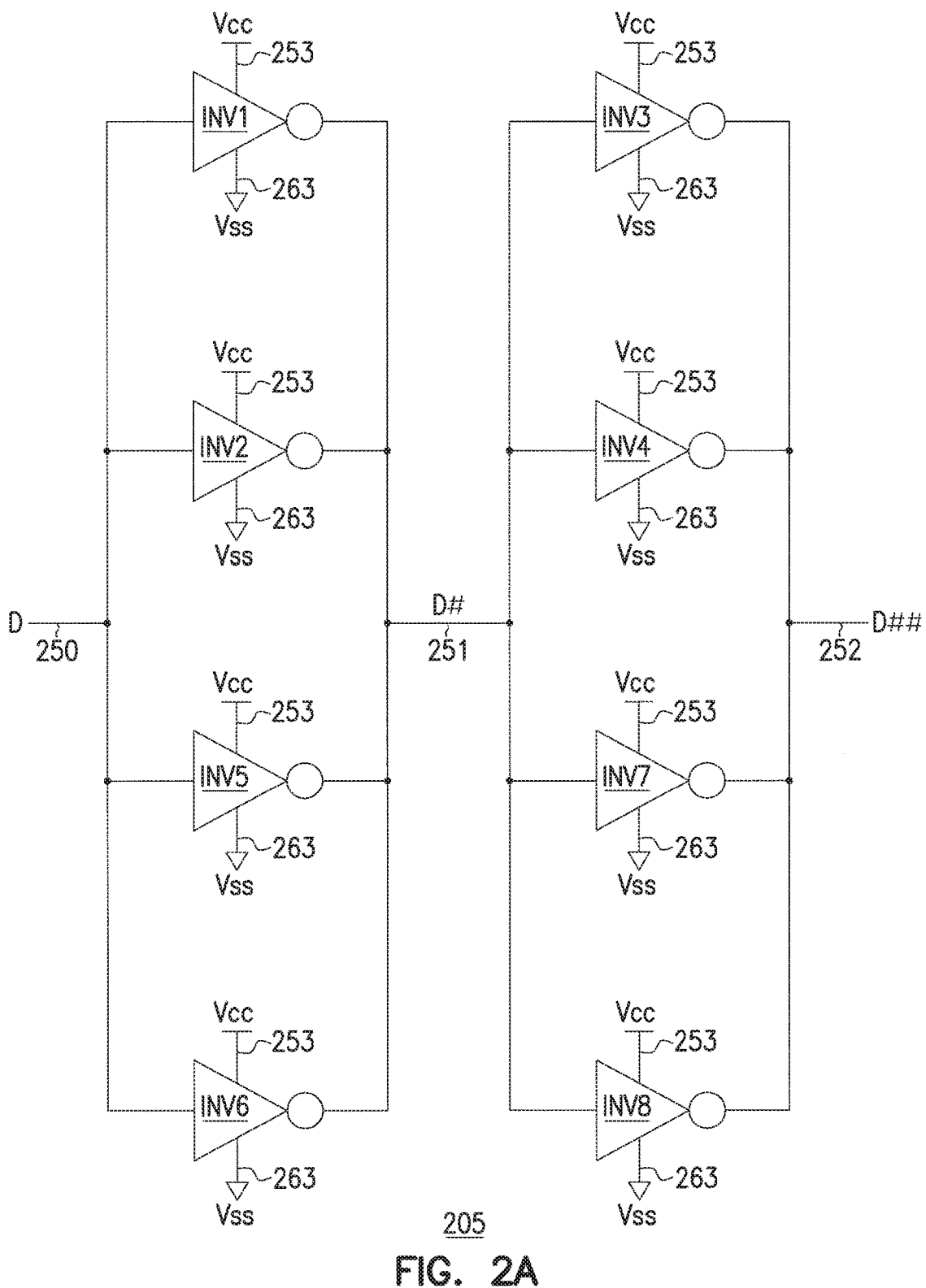
FIG. 2A shows a schematic diagram of a driver circuit including inverters, according to some embodiments described herein.

The techniques described herein include ways to help protect a device (e.g., an IC chip) or system (e.g., system-on-chip (SoC)) from photonic emission attacks. Photon emission from a device or system can be a significant side-channel that may leak confidential information (e.g., encryption/decryption keys) while such information is transmitted on conducive paths (e.g., a bus) between internal components of the device. This side-channel leakage can be exploited by a photonic emission attack. Such an attack can involve using a photon sensor to monitor photon emission on a portion on the bus of the device for large number (e.g., millions) of cycles. By analyzing the monitored photon emission, the value of confidential information transmitted over the bus can be reconstructed, thereby compromising the security and confidentiality of any encrypted information in the device.

The techniques described herein include a driver circuit, which can be part of transmission paths (e.g., on-chip or on-die bus) between components of a device or a system. The described techniques include strategic arrangements of diffusion regions of the driver circuit. In some examples, the driver circuit has symmetric physical layout. In an example arrangement, the layout of the driver circuit includes interleaved diffusion regions. In another example arrangement, the layout of the driver circuit includes complementary dummy diffusion regions. These arrangements of the diffusion regions of the driver circuit can provide uniform transitions (signal switching) activity on both rising and falling transitions of signals transmitted from the diffusion regions. As a result, photonic emission profiles of the driver circuit may be constant, regardless of information (e.g., data) activity transmitted on the bus. Further, the arrangements of the diffusion regions of the driver circuit may also prevent a flat photonic emission profile, regardless of the state (e.g., static state) of the driver output. These photonic emission profiles of the driver circuit can be difficult to analyze. Thus, in comparison with some conventional driver circuits, the described driver circuit may have a higher resistance against (e.g., be less vulnerable to) photonic emission attacks.

FIG. 1 shows an apparatus 100 including functional units 101 and 102 and a bus 103 including driver circuits 105, according to some embodiments described herein. Apparatus 100 can include or be included in an electronic device or system, such as a processor, a system on chip (SoC), or other electronic devices or systems. The processor can include a general purpose processor or an application-specific integrated circuit (ASIC).

As shown in FIG. 1, apparatus 100 can include a semiconductor substrate (e.g., semiconductor die, such as a silicon die) 106, which can be part of an IC die of apparatus 100. Functional units 101 and 102 and bus 103 (which includes driver circuits 105) can be located (e.g., formed in or formed on) semiconductor substrate 106.

Functional unit 101 can include a processing core (e.g., central processing unit (CPU) that includes arithmetic logic unit (ALU)). Function unit 102 can be configured (e.g., can include hardware circuitry, software instructions, or both) to perform encryption of information (e.g., data), decryption of information, or both. As an example, functional unit 102 can include an encryption engine (e.g., Advanced Encryption Standard engine) located at the same semiconductor substrate 106 as the processing core. The information to be encrypted or decrypted by functional unit 102 can be transmitted to functional unit 102 by functional unit 101.

Functional unit 101 can operate to transmit information to functional unit 102 in the form of signals (e.g., input signals) $D_0$ and $D_N$ through bus 103. Each of signals $D_0$ and $D_N$ can carry bits of information. Bus 103 (e.g., on-chip or on-die bus) can be a point-to-point transmission path between functional units 101 and 102. Bus 103 can operate to carry information (e.g., bits of data) between functional units 101 and 102. For example, bus 103 can operate to propagate (e.g., to drive) signals $D_0$ and $D_N$ and provide them to functional unit 102 as signals (e.g., output signals) $D_0\#\#$ and $D_N\#\#$, respectively. The value of information carried by signals $D_0\#\#$ is the same as the value of information carried by signal $D_0$. The value of information carried by signals $D_N\#\#$ is the same as the value of information carried by signal $D_N$.

As shown in FIG. 1, bus 103 can include paths (e.g., bus paths or bus lanes) $104_0$ and $104_N$. Two paths $104_0$ and $104_N$ are shown as an example. However, the number of paths of bus 103 can vary. For example, bus 103 can include 64 paths (e.g., to carry 64 bits of data in parallel).

Each of paths $104_0$ and $104_N$ includes a respective driver circuit 105 and may include other circuit elements (e.g., not shown in FIG. 1) coupled to circuit 105. Driver circuits 105 of paths $104_0$ and $104_N$ can have the same components. Each of driver circuits 105 can include an inverter-type buffer (e.g., complementary metal-oxide semiconductor (CMOS) buffer).

Each of driver circuits 105 can be structured to have enough strength (e.g., drive strength) to propagate a respective signal (among signals $D_0$ and $D_N$) from functional unit 101 to functional unit 102. For example, driver circuit 105 of path $104_0$ can operate to propagate signal (input signal) $D_0$ from functional unit 101 and provide signal $D_0$ to functional unit 102 as signal (e.g., output signal) $D_0\#\#$. Similarly, driver circuit 105 of path $104_N$ can operate to propagate signal (input signal) $D_N$ from functional unit 101 and provide signal $D_N$ to functional unit 102 as signal (e.g., output signal) $D_N\#\#$.

FIG. 1 shows an example where driver circuits 105 are outside (e.g., not part of) functional units 101 and 102. Alternatively, portions of each of driver circuits 105 (or all of driver circuits 105) can be included in (e.g., can be a part of) functional unit 101 or functional unit 102.

Driver circuits 105 can include circuit elements that are strategically arranged in order to help protect apparatus 100 from photonic emission attacks. Driver circuits 105 can include circuit elements and operations similar to or the same as any of the driver circuits described below with reference to FIG. 2A through FIG. 4.

FIG. 2A shows a schematic diagram of a driver circuit 205 including inverters INV1 through INV8 and connections 250, 251, 252, 253, and 263, according to some embodiments described herein. Driver circuit 205 can be used as driver circuit 105 of each of paths $104_0$ and $104_N$ of bus 103 in FIG. 1. Driver circuit 205 of FIG. 2A can operate to propagate a signal (e.g., input signal) D at a node (e.g., input node) coupled to connection 250 and provide signal D as a signal (e.g., output signal) D## at a node (e.g., output node) coupled to connection 252. Signal D can correspond to one of signals $D_0$ and $D_N$ of FIG. 1. Signal D## of FIG. 2A can correspond to one of signals $D_0\#\#$ and $D_N\#\#$ of FIG. 1. Signal D in FIG. 2A can be provided by a functional unit, such as functional unit 101 of FIG. 1. Signal D## in FIG. 2A can be provided to another functional unit, such as functional unit 102 of FIG. 1. In FIG. 2A, voltages Vcc and Vss can be supply of driver circuit 205. Voltage Vcc can have a positive value. Voltage Vss can be 0V (e.g., ground potential).

Connections 250, 251, 252, 253, and 263 can include conductive routing paths coupled to respective nodes (e.g., input or output nodes) of inverters. Each of connections 250, 251, 252, 253, and 263 can carry (e.g., receive or provide) the same signal (e.g., a signal presenting data) or the same supply voltages (e.g., Vcc or Vss). For example, as shown in FIG. 2A, connection 250 can be coupled to input nodes (which receive signal D) of inverters INV1, INV2, INV5, and INV6. Connection 251 can be coupled to output nodes (which provide signal D#) of inverters INV1, INV2, INV5, and INV6 input nodes (which receive signal D#) of inverters INV3, INV4, INV7, and INV8. Connection 252 can be coupled to output nodes (which provide signal D##) of inverters INV3, INV4, INV7, and INV8. Connection 253 can be coupled to a supply node (e.g., a positive supply node) of inverters INV1 through INV8 to receive voltage Vcc. Connection 263 can be coupled to another supply node (e.g., a ground node) to receive voltage Vss.

FIG. 2A shows driver circuit 205 including eight inverters as an example. The number of inverters can vary. For example, driver circuit 205 can include X inverters coupled in parallel between connections 250 and 251 (similar to inverters INV1, INV2, INV5, and INV6) and X inverters coupled in parallel between connections 251 and 252 (similar to inverters INV3, INV4, INV7, and INV8) where X can be different from 4 (e.g., X>4).

Inverters INV1 through INV8 can be coupled among each other through connections 250, 251, 252, 253, and 263 to form an inverter-type buffer circuit, such that signal D# (at connection 251) is an inverted version of signal D (at connection 250), and signal D## (at connection 252) is an inverted version of signal D#. Inverters INV1 through INV8 can include CMOS-type transistors.

Figure 2B:
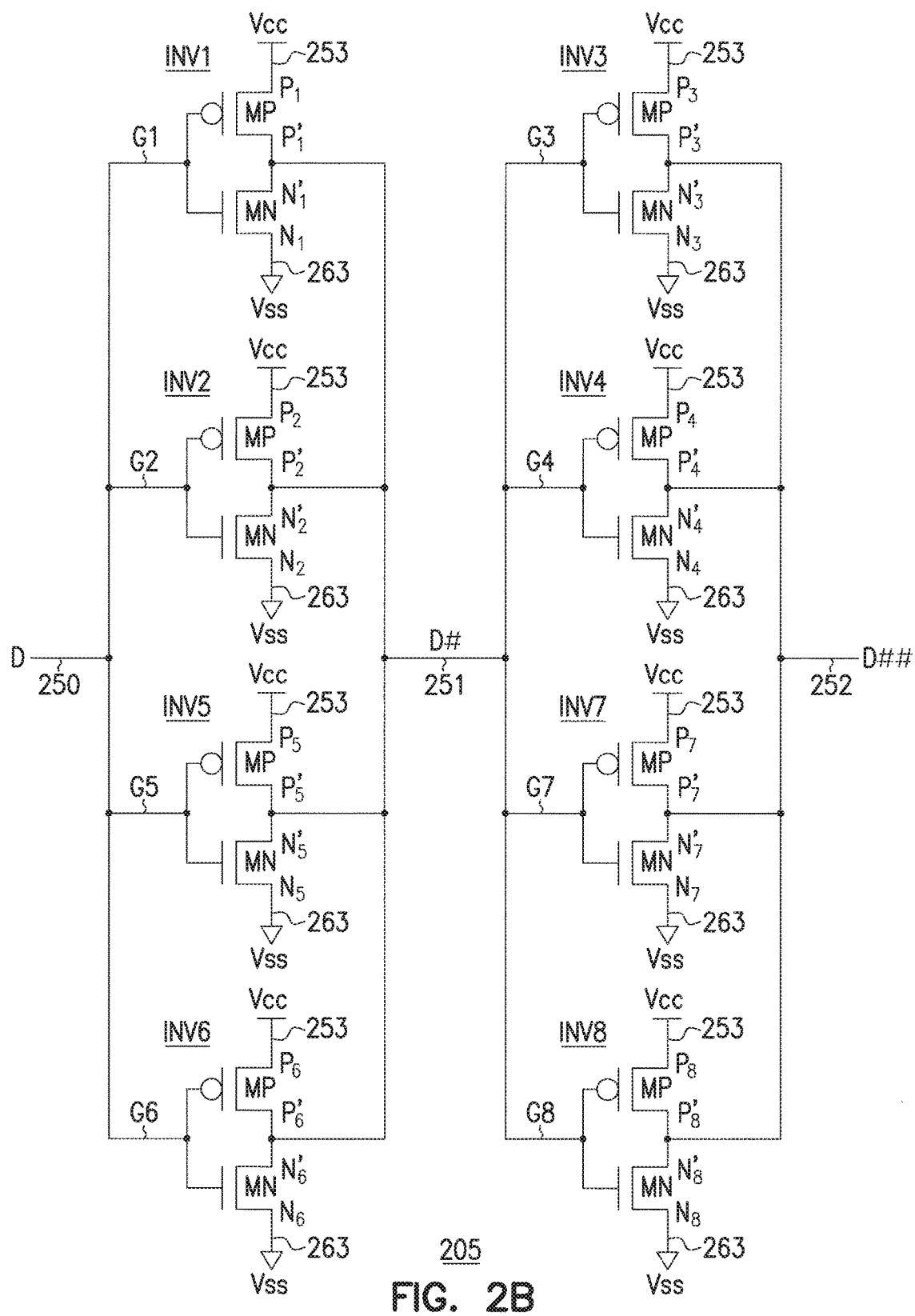
FIG. 2B shows a schematic diagram including transistors of the inverters of FIG. 2A, according to some embodiments described herein.

FIG. 2B shows a schematic diagram including transistors MP and MN of inverters INV1 through INV8 of driver circuit 205 of FIG. 2A, according to some embodiments described herein. As shown in FIG. 2B, each of inverters INV1 through INV8 can include two transistors (a transistor MP and a transistor MN), and a gate (one of gates G1 through G8) shared by the two transistors. For example, inverter INV1 may include transistors MP and MN and gate G1 shared by transistors MP and MN of inverter INV1. Transistor MP of each of inverters INV1 through INV8 can include a field effect transistor (FET), such as a PMOS transistor. Transistor MN of each of inverters INV1 through INV8 can include a FET, such as an NMOS transistor. In FIG. 2B, signals D, D#, and D## and voltages Vcc and Vss at respective connections 250, 251, 252, 253, and 263 are the same as those shown in FIG. 2A.

In each of inverters INV1 through INV8, each of transistors MP has a source and a drain (labeled by P and P', respectively, and an associated subscript number (1 through 8)). Each of transistors MN has a source and a drain (labeled by N and N', respectively, and an associated subscript number (1 through 8)). For example, in inverter INV1, transistor MP includes a source $P_1$ and a drain $P_1'$, and transistor MN includes a source $N_1$ and a drain $N_1'$. In another example, in inverter INV2, transistor MP includes a source $P_2$ and a drain $P_2'$, and transistor MN includes a source $N_2$ and a drain $N_2'$. Transistor MP and MN in each of the other inverters (INV3 through INV8) have sources and drains that are labeled by similar patterns as INV1 and INV2.

The sources and drains of transistors MP and MN of INV1 through INV8 of driver circuit 205 can be formed by diffusion regions in a semiconductor substrate (e.g., substrate 106 of FIG. 1) where driver circuit 205 is located.

Figure 2C:
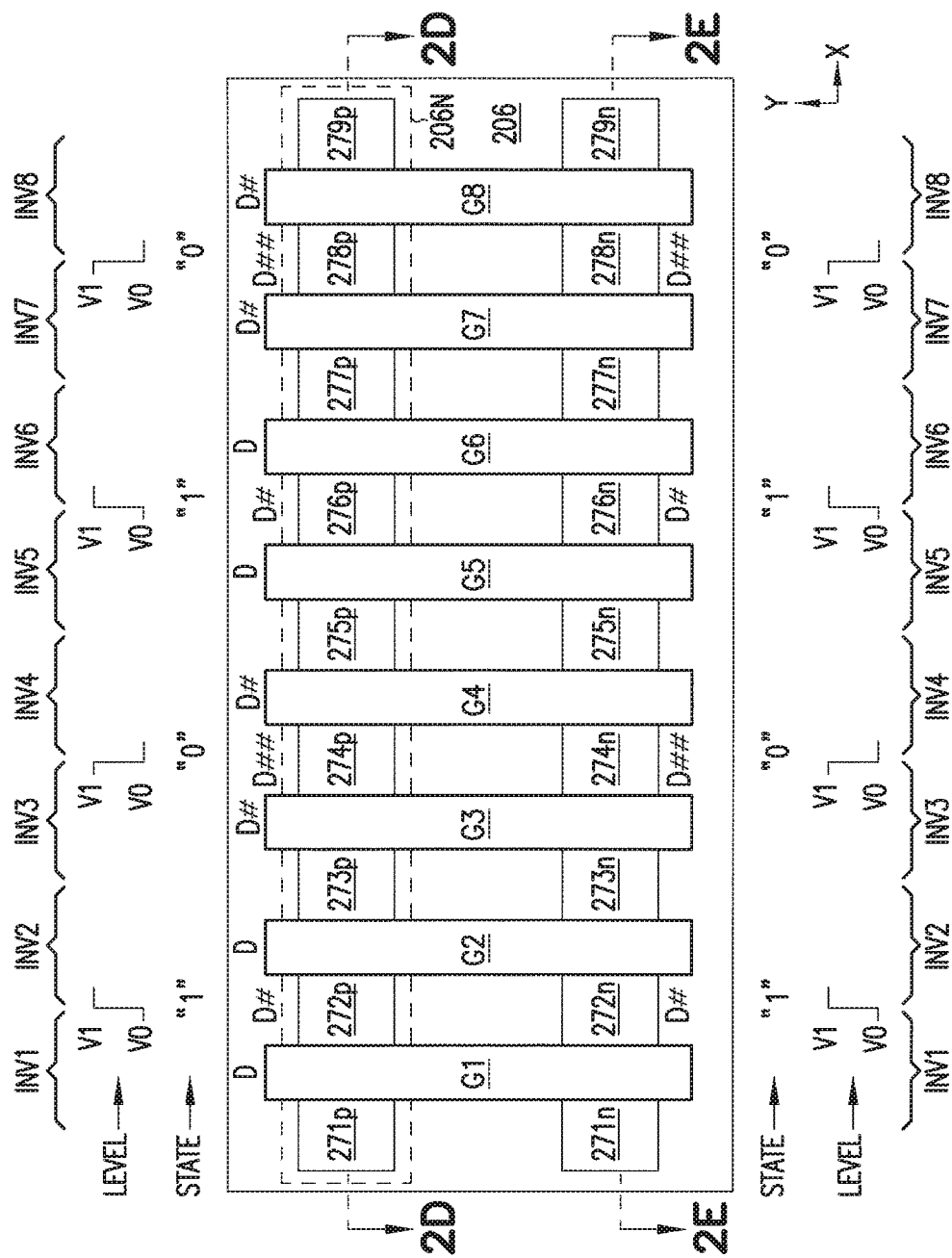
FIG. 2C shows a top view (e.g., layout) including diffusion regions and gates of the driver circuit of FIG. 2B, according to some embodiments described herein.
Figure 2D:
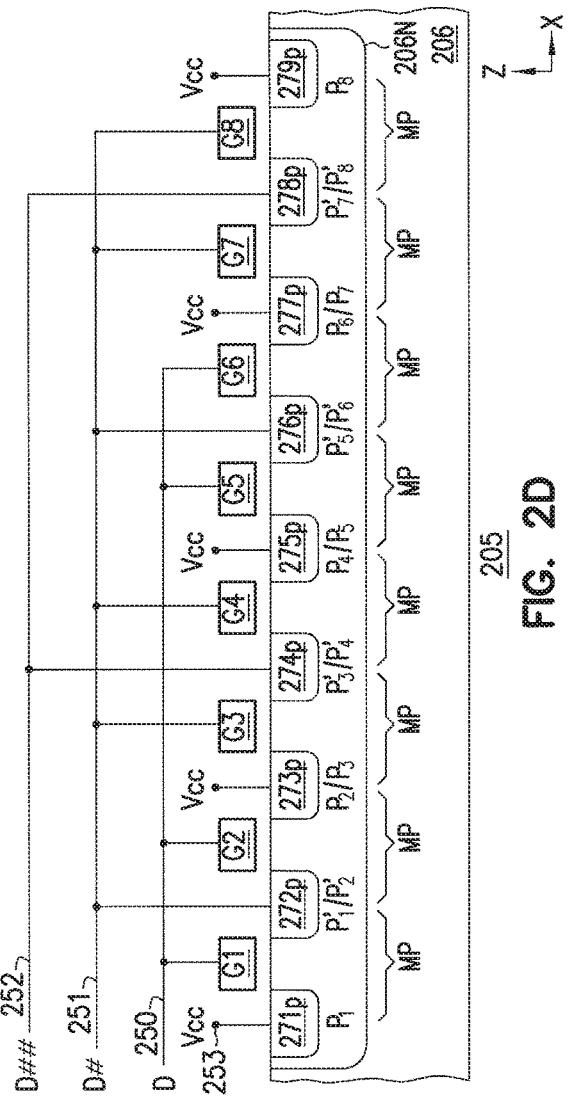
FIG. 2D shows a cross-sectional view of a portion including p-channel metal-oxide semiconductor (PMOS) transistors of the driver circuit of FIG. 2C, according to some embodiments described herein.

FIG. 2C shows a top view (e.g., layout) of driver circuit 205 including diffusion regions 271p through 279p and 271n through 279n, and gates G1 through G8 of inverters INV1 through INV8 of FIG. 2B, according to some embodiments described herein. As shown in FIG. 2D, driver circuit 205 can include a substrate (e.g., semiconductor substrate) 206.

Substrate 206 can be similar to substrate 106 of FIG. 1. Substrate 206 can include a substrate portion 206N. The material of substrate portion 206N can be different from the material of other portions of substrate 206 (e.g., portions of substrate 206 that are outside substrate portion 206N). For example, substrate portion 206N can include a material of n-type conductivity, and substrate 206 (e.g., outside substrate portion 206N) can include a material of p-type conductivity. As an example, substrate portion 206N can be structured as an n-well portion in a p-type substrate 206.

As shown in FIG. 2C, diffusion regions 271p through 279p can be formed adjacent each other in a location of substrate 206 (inside substrate portion 206N) in an x-dimension. Diffusion regions 271n through 279n can be formed adjacent each other in another location (outside substrate portion 206N) of substrate 206 in the x-direction. Adjacent diffusion regions are diffusion regions located immediately one next to another.

Figure 2E:
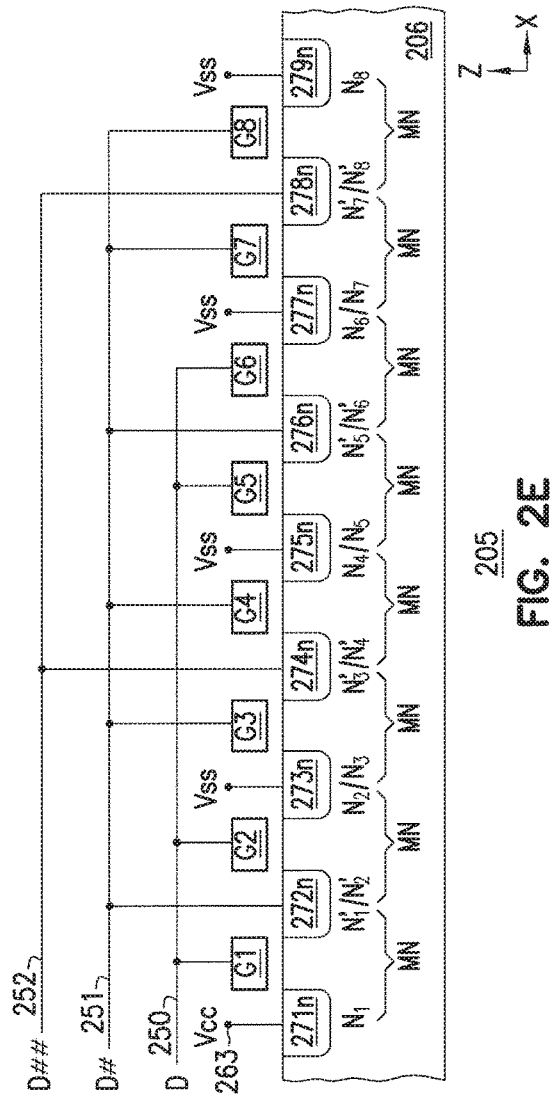
FIG. 2E shows a cross-sectional view of another portion including n-channel metal-oxide semiconductor (NMOS) transistors of the driver circuit of FIG. 2C, according to some embodiments described herein.

Gates G1 through G8 of respective inverters INV1 through INV8 have lengths extending in the y-dimension and can be formed over substrate 206 and between diffusion regions 271p through 279p and between diffusion regions 271n through 279n. Side views (cross-sectional views) in a z-dimension of driver circuit 205 taken along line 2D-2D and line 2E-2E are shown in FIG. 2D and FIG. 2E, respectively. Detailed description of FIG. 2C is provided below after the description of FIG. 2D and FIG. 2E.

As shown in FIG. 2D diffusion regions 271p through 279p are regions inside substrate portion 206N of substrate 206 that can be doped with impurities of p-type. Thus, diffusion regions 271p through 279p can include materials of p-type conductivity. Diffusion regions 271p through 279p can form respective sources ($P_1$ through $P_8$) and drains ($P_1'$ through $P_8'$) of transistors MP inverters INV1 through INV8.

Each of inverters INV1 through INV8 can include a portion of a diffusion region among diffusion regions 271p through 279p and a portion of an adjacent diffusion region among 271p through 279p (that form transistor MP of the inverter). For example, inverter INV1 includes a portion of diffusion region 271p (that forms source $P_1$ of inverter transistor MP of inverter INV1) and a portion of an adjacent diffusion region 272p (that forms drain $P_1'$ of transistor MP of inverter INV1). Two transistors MP of two respective inverters can share a diffusion region. For example, inverters INV1 and INV2 can share diffusion region 272p, which forms drains $P'_1$ and $P'_2$ of transistors MP of inverter INV1 and INV2, respectively.

Each of gates G1 through G8 can be located over a region (e.g., a channel region) of substrate 206 between two of diffusion regions 271p through 279p. Gates G1 through G8 can include conductive materials, such as conductively doped polysilicon, metal, or other conductive materials.

In FIG. 2E, diffusion regions 271n through 279n are regions in substrate 206 (outside substrate portion 206N) that can be doped with impurity of n-type conductivity. Thus, diffusion regions 271n through 279n can include materials of n-type conductivity. Diffusion regions 271n through 279n can form sources ($N_1$ through $N_8$) and drains ($N'_1$ through $N_8'$) of the transistors MN of inverters INV1 through INV8.

Each of inverters INV1 through INV8 can include a portion of a diffusion region among diffusion regions 271n through 279n and a portion of an adjacent diffusion region among diffusion regions 271n through 279n (that form transistor MN of the inverter). For example, inverter INV1 includes a portion of diffusion region 271n (that forms source $N_1$ of inverter transistor MN of inverter INV1) and a portion of an adjacent diffusion region 272n (that forms drain $N'_1$ of transistor MN of inverter INV1). Two transistors MN of two respective inverters can share a diffusion region. For example, inverters INV1 and INV2 can share diffusion region 272n, which forms sources $N'_1$ and $N'_2$ of transistors MN of inverter INV1 and INV2, respectively.

Gates G1 through G8 are the same as gates G1 through G8 in FIG. 2D. As shown in FIG. 2E, each of gates G1 through G8 can be located over a region (e.g., a channel region) of substrate 206 between two of diffusion regions 271n through 279n.

In FIG. 2D and FIG. 2E, signals D, D#, and D## at respective diffusion regions 271p through 279p and gates G1 through G8 are the same as those shown in FIG. 2B. Connections 250, 251, 252, 253, and 263 in FIG. 2D and FIG. 2E are also the same as those shown in FIG. 2B. Connections 250, 251, 252, 253, and 263 can be formed over substrate 206 and can include conductive material (e.g., conductively doped polysilicon, metal (e.g., metal lines), or other conductive materials). As shown in FIG. 2D and FIG. 2E, diffusion regions 271p through 279p and gates G1 through G8 can be coupled to respective connections 250, 251, 252, 253 and 263. For example, gates G1, G2, G5, and G6 can be coupled to connection 250 (associated with signal D). Gates G3, G4, G7, and G8 and diffusion regions 272p, 276p, 272n, and 276n can be coupled to connection 251 (associated with signal D#). Diffusion regions 274p, 278p, 274n, and 278n can be coupled to connection 252 (associated with signal D##).

FIG. 2C shows signal-level switching activity (e.g., transient activity) of signal D# at diffusion regions 272p, 276p, 272n, and 276n, and signal D## at the diffusion regions 274p, 278p, 274n, and 278n. In operation, when signal D switches from one level to another level, each of signals D# and D## switches between different levels but in opposite directions from each other. For example, when signal D switches from a level (not shown in FIG. 2C) corresponding to voltage V1 to a level (not shown in FIG. 2C) corresponding to voltage V0, signals D# (as shown in FIG. 2C) switches from a level corresponding to voltage V0 (e.g., a lower level) to a level corresponding to voltage V1 (e.g., a higher level); and signal D## (as shown in FIG. 2C) switches from a level corresponding to voltage V1 to a level corresponding to voltage V0. Voltage V0 can have a value (e.g., a value corresponding to logic 0) equal to the value of voltage Vss. Voltage V1 can have a value (e.g., a value corresponding to logic 1) equal to the value of voltage Vcc.

FIG. 2C also shows states (e.g., static states) "0" (logic 0) and "1" (logic 1) at respective diffusion regions 272p, 272n, 274p, 274n, 276p, 276n, 278p, and 278n when signal D switches from one level to another level. For example, when signal D switches from a level corresponding to voltage V1 to a level corresponding to voltage V0, diffusion regions 272p, 272n, 276p, and 276n can have state "1", and diffusion regions 274p, 274n, 278p, and 278n can have state "0", which is opposite from state "1" of diffusion regions 272p, 272n, 276p, and 276n.

Although not shown in FIG. 2C, signal D# and D## can also switch in opposite directions in another situation different from the example situation shown in FIG. 2C. For example, when signal D switches from a level corresponding to voltage V0 (e.g., a lower level) to a level corresponding to voltage V1 (e.g., a higher level), signal D# can switch from a level corresponding to voltage V1 to a level corresponding to voltage V0, and signal D## can switch from a level corresponding to voltage V0 to a level corresponding to voltage V1. In such a situation, diffusion regions 272p, 272*n*, 276*p*, and 276*n* (associated with signal D#) can have state "0", and diffusion regions 274*p*, 274*n*, 278*p*, and 278*n* (associated with signal D##) can have state "1".

Thus, as shown in FIG. 2C, diffusion regions 272*p*, 272*n*, 276*p*, and 276*n* and 274*p*, 274*n*, 278*p*, and 278*n* are arranged in a particular arrangement, such that signals (e.g., D# and D##) having complementary behavior during operations of driver circuit 205 can be placed as close to each other as possible. This particular arrangement can be called an interleaved arrangement. This interleaved arrangement helps protect driver circuit 205 from photonic emission attacks.

Driver circuit 205 may have a higher resistance against photonic emission attacks than some conventional driver circuits. For example, some conventional driver circuits may have structures where a large number of diffusion regions having the same operational behavior (e.g., signals at these diffusion regions have the same transient behavior) are placed near each other. Photon emissions in such conventional driver circuits can be detected with a large aperture photon detector. Further, photon detectors can also distinguish static activity of the bus that includes the conventional driver circuits (e.g., leakage activity of the bus while it remains (e.g., parks) at a static state, such as at a supply voltage Vcc). Such signal-transient behavior and static activity in conventional driver circuits may cause them to be vulnerable to photonic emission attacks.

In driver circuit 205, the interleaved arrangement diffusion regions 271*p* through 279*p* and 271*n* through 279*n* (FIG. 2C, FIG. 2D, and FIG. 2E) allow signals D# and D## to have complementary behavior (e.g., switch in opposite directions) and allow the states (e.g., static states) of these diffusion regions to have opposite values (e.g., at V1 (e.g., Vcc) and V0 (e.g., Vss)). Thus, photon emission from driver circuit 205 can be averaged (due to the interleaved arrangement diffusion regions 271*p* through 279*p* and 271*n* through 279*n*). This may make analysis of photon emission from driver circuit 205 difficult. For example, it may be difficult to analyze photon emission from driver circuit 205 if the photon emission is sensed by a photon sensor having a large aperture (e.g., relative to a transistor pitch of driver circuit 205). Thus, any confidential information (e.g., encryption/decryption keys) propagated by driver circuit 205 may be hard to reconstruct. Therefore, as described above, the structures (e.g., the interleaved arrangement of the diffusion regions) of driver circuit 205 may allow it to be less vulnerable to photonic emission attacks in comparison to some conventional driver circuits.

Figure 3A:
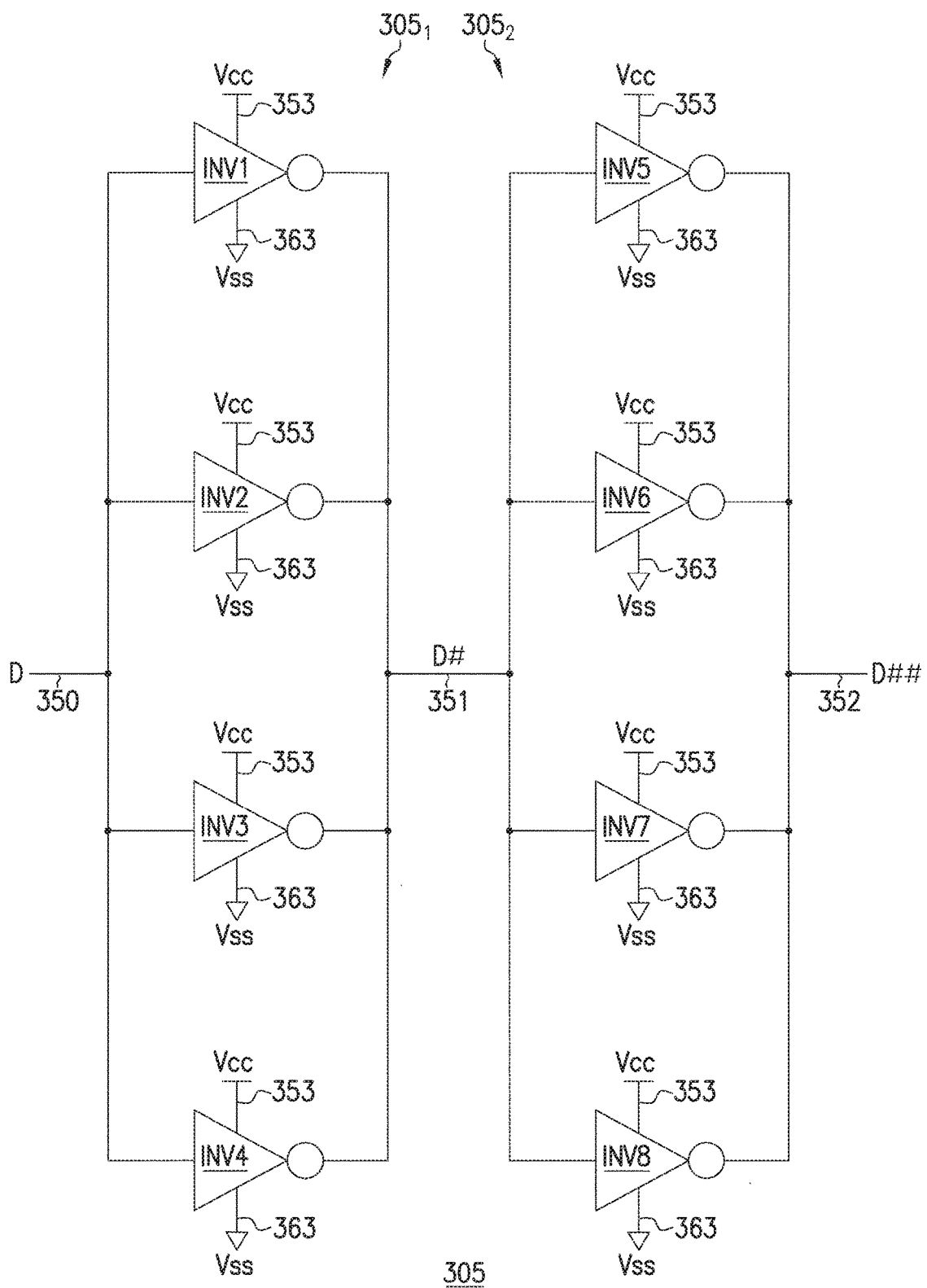
FIG. 3A shows a schematic diagram of another driver circuit, according to some embodiments described herein.

FIG. 3A through FIG. 3H shows a driver circuit 305 including dummy gates and diffusion regions, according to some embodiments described herein. Driver circuit 305 can be used as driver circuit 105 of each of paths $104_0$ and $104_N$ of bus 103 in FIG. 1. As shown in FIG. 3A, driver circuit 305 can include inverters INV1 through INV8 and connections 350, 351, 352, 353, and 363. Driver circuit 305 can operate to propagate signal D at a node (e.g., input node) coupled to connection 350 and provide signal D as signal D## at a node (e.g., output node) coupled to connection 352. Signal D can correspond to one of signals $D_0$ and $D_N$ of FIG. 1. Signal D## of FIG. 3A can correspond to one of signals $D_0$## and $D_N$## of FIG. 1. Signal D in FIG. 3A can be provided by a functional unit, such as functional unit 101 of FIG. 1. Signal D## in FIG. 3 can be provided to another functional unit, such as functional unit 102 of FIG. 1.

As shown in FIG. 3A, inverters INV1 through INV4 can be part of a driver portion (e.g., input stage) $305_1$ of a driver circuit 305. Inverters INV5 through INV8 can be part of a driver portion (e.g., output stage) $305_2$ of a driver circuit 305. Connection 350 can be coupled to input nodes of inverters INV1 through INV4. Connection 351 can be coupled to output nodes of inverters INV1 through INV4 and input nodes of inverters INV5 through INV8. Connection 352 can be coupled to output nodes of inverters INV5 through INV8. Connection 353 can be coupled to a supply node (e.g., a positive supply node) of inverters INV1 through INV8 to receive voltage Vcc. Connection 363 can be coupled to another supply node (e.g., a ground node) of inverters INV1 through INV8 to receive voltage Vss.

Driver circuit 305 can propagate signal D from connection 350 to connection 351 as signal D#, and propagate signal D# from connection 351 to connection 352 as signal D##. Signals D and D# can switch in opposite directions, and signals D# and D## can switch in opposite direction. For example, when signal D switches its levels from a higher level (e.g., logic 1) to a lower level (e.g., logic 0), signal D# switches its levels from a lower level (e.g., logic 0) to a higher level (e.g., logic 1) and D## switches from a higher level (e.g., logic 1) to a higher level (e.g., logic 0).

FIG. 3A shows driver circuit 305 including eight inverters as an example. The number of inverters can vary. For example, driver circuit 305 can include I inverters coupled in parallel between connections 350 and 351 (similar to inverters INV1, INV2, INV3, and INV4 of driver portion $305_1$) and I inverters coupled in parallel between connections 351 and 352 (similar to inverters INV5, INV6, INV7, and INV8 of driver portion $305_2$) where I can be different from 4 (e.g., I>4). Further, driver circuit 305 includes other circuit elements (e.g., dummy devices) that are omitted from FIG. 3A for simplicity.

Figure 3B:
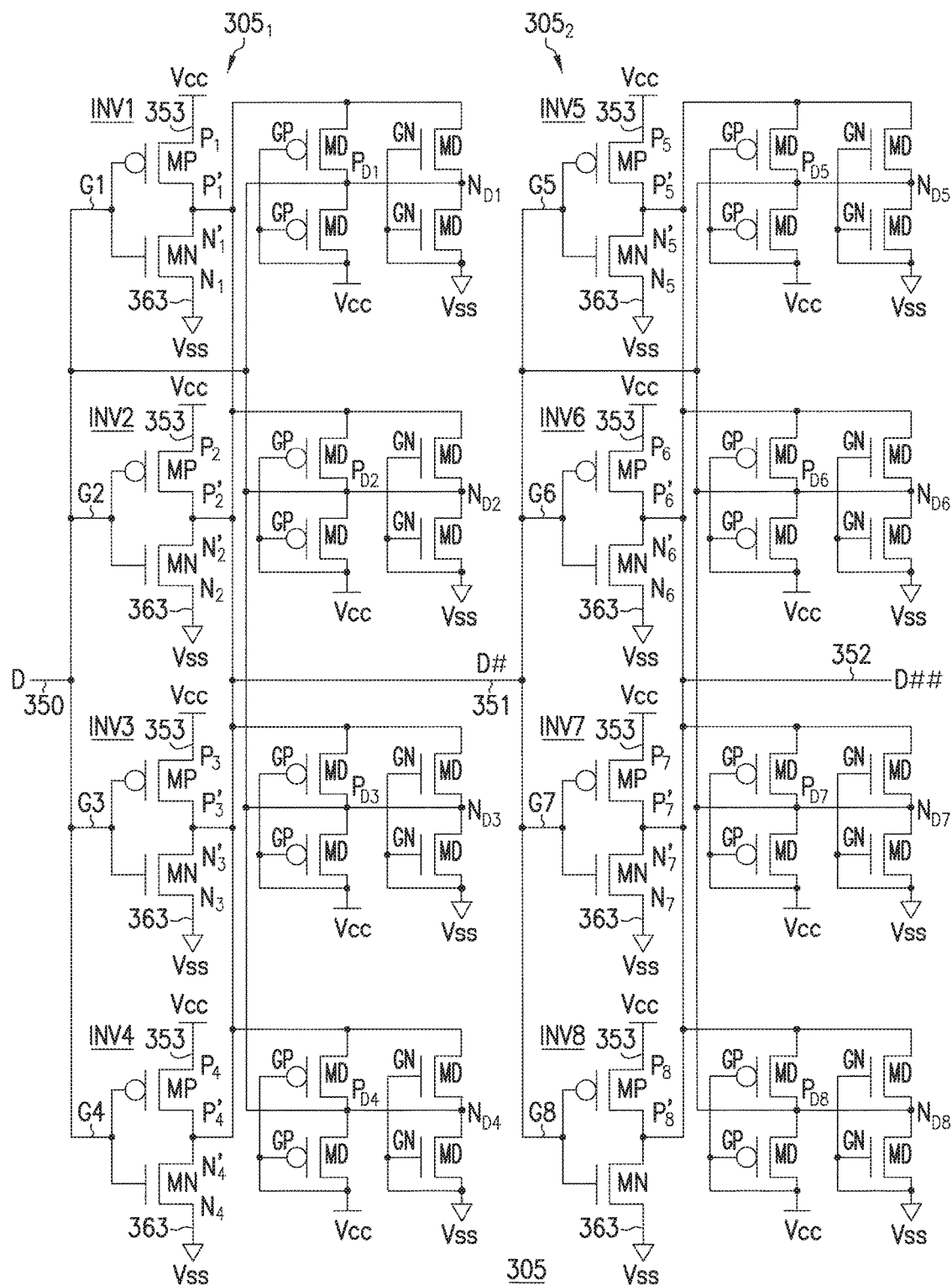
FIG. 3B shows a schematic diagram including transistors of inverters, and dummy devices of the driver circuit of FIG. 3A, according to some embodiments described herein.

FIG. 3B shows a schematic diagram including transistors MP and MN of inverters INV1 through INV8, and devices MD) of driver circuit 305 of FIG. 3A, according to some embodiments described herein. As shown in FIG. 3B, inverters INV1 through INV8 of driver portions $305_1$ and $305_2$ can include respective transistors MP and MN having respective shared gates G1 through G8. Transistors MP can include sources $P_1$ through $P_8$ and drains $P_1'$ through $P_8'$. Transistors MN can include sources $N_1$ through $N_8$ and drains $N_1'$ through $N_8'$. Transistors MP and MN can be coupled to connections 350, 351, 352, 353, and 363 that provide signals D, D#, and D##, voltage Vcc, and voltage Vss, respectively.

As shown in FIG. 3B, devices MD can be structured as transistors and are coupled to respective transistors MP and MN in ways shown in FIG. 3B. Devices MD can include respective gates GP and UN, and sources/drains $P_{D1}$ through $P_{D8}$ and $N_{D1}$ through $N_{D8}$. Devices MD may be called "dummy" devices (or dummy transistors). Devices MD may not be part of the operations of inverters INV1 through INV8. However, as described in more detail below, including devices MD in driver circuit 305 may protect driver circuit 305 from photonic emission attacks.

Figure 3C:
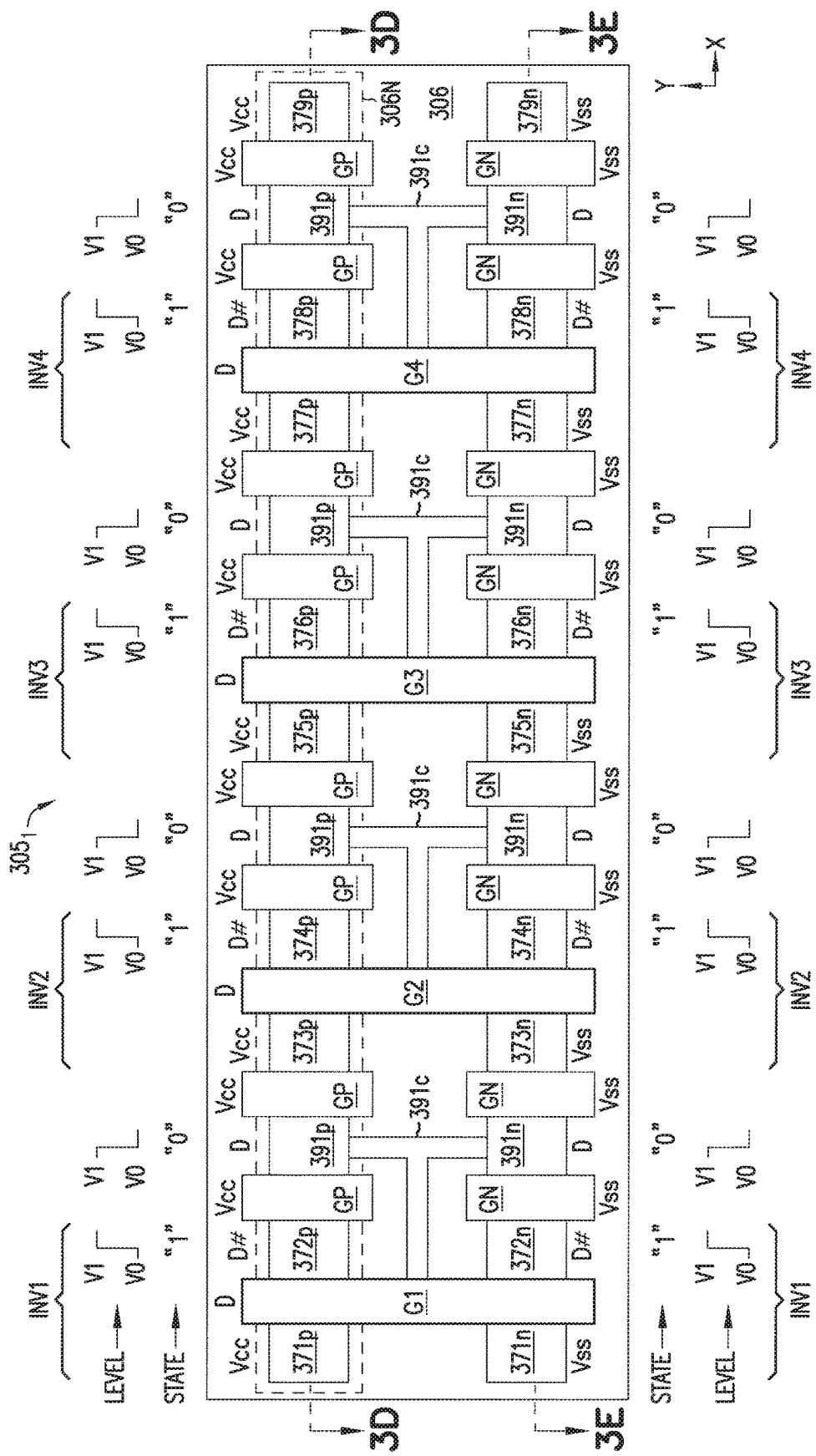
Figure 3F:
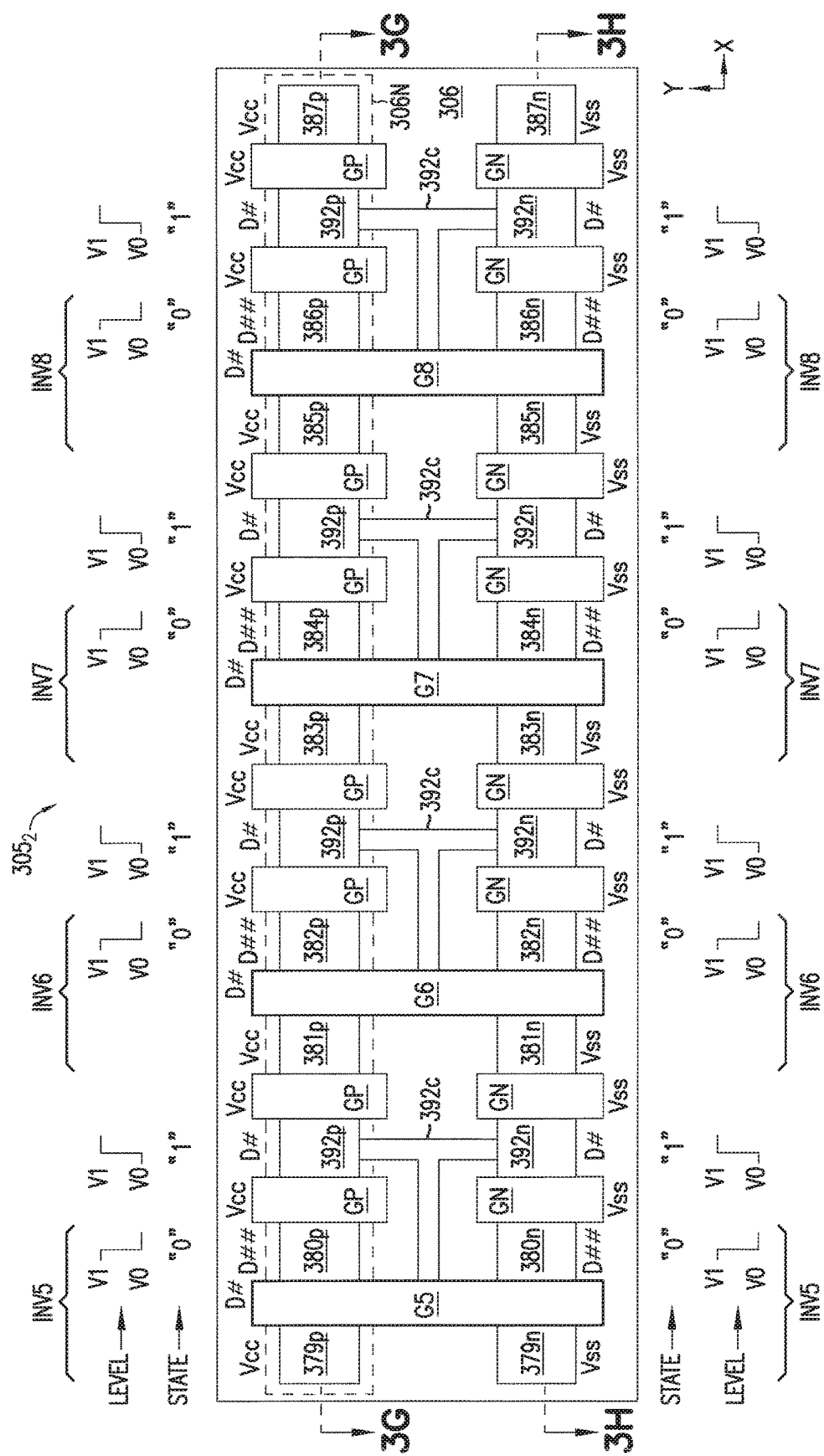
FIG. 3F, FIG. 3G, and FIG. 3H show a top view (e.g., layout) and cross-sectional views of another portion of the driver circuit of FIG. 3B, according to some embodiments described herein.
Figure 3G:
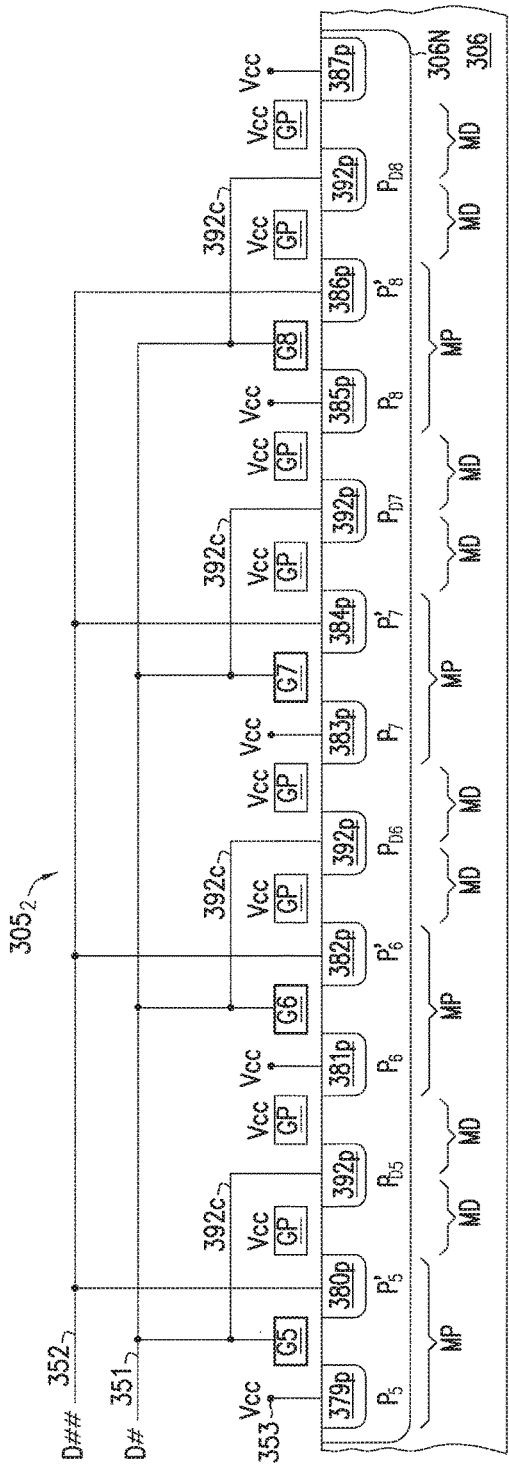
Figure 3H:
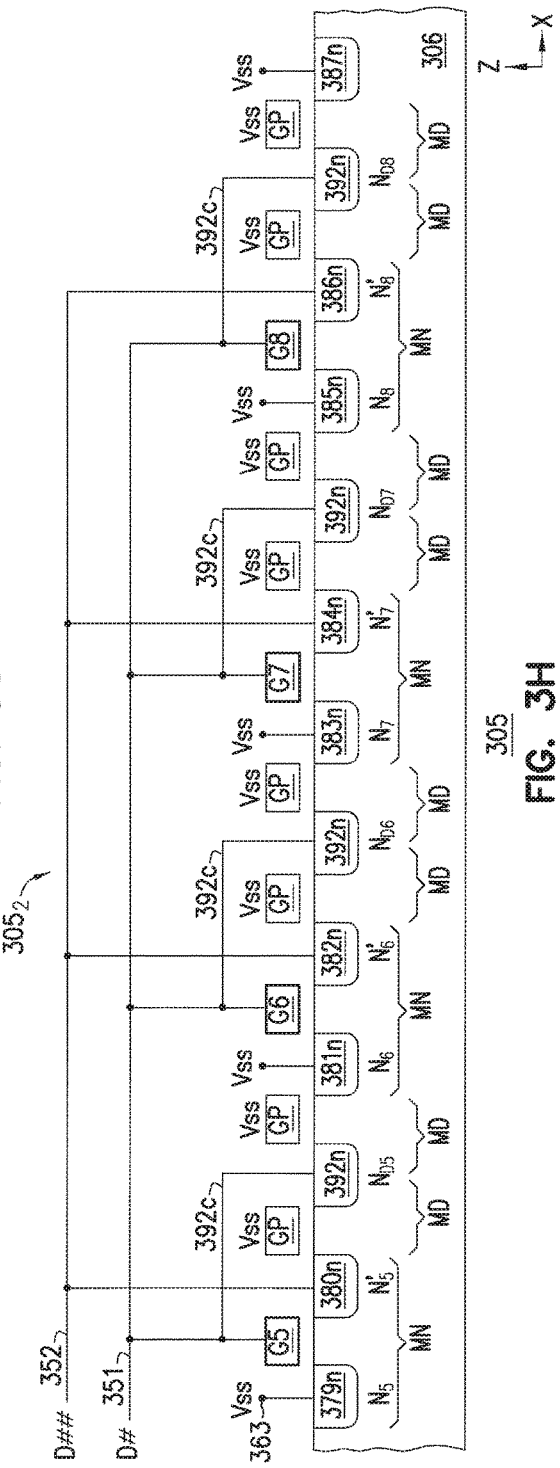

The structure (e.g., layout) of driver portions $305_1$ and $305_2$ of driver circuit 305 is shown in FIG. 3C through FIG. 3H. Briefly, FIG. 3C, FIG. 3D, and FIG. 3E show a structure of driver portion $305_1$. FIG. 3F, FIG. 3G, and FIG. 3H show a structure of driver portion $305_2$, which is described after the description of FIG. 3C, FIG. 3D, and FIG. 3E.

FIG. 3C shows a top view (e.g., layout) of driver portion $305_1$ of driver circuit 305 including diffusion regions 371*p* through 379*p* and 371*n* through 379*n*, and gates G1 through G8 of inverters INV1 through INV4 of FIG. 3B, and additional diffusion regions 391*p* and 391*n* and additional gates GP and GN, according to some embodiments described herein. As shown in FIG. 3C, driver circuit 305 can include a substrate (e.g., semiconductor substrate) 306. Substrate 306 can include a substrate portion 306N. The material of substrate portion 306N can be different from the material of other portions of substrate 306N (e.g., portions of substrate 306 that are outside substrate portion 306N). For example, substrate portion 306N can include a material of n-type conductivity, and substrate 306 (e.g., outside substrate portion 306N) can include a material of p-type conductivity. As an example, substrate portion 306N can be structured as an n-well portion in a p-type substrate 306.

As shown in FIG. 3C, diffusion regions 371p through 379p, and 391p, can be formed adjacent each other in a location of substrate 306 (inside substrate portion 306N) in the x-dimension. Diffusion regions 371n through 379n, and 391n, can be formed adjacent each other in another location of substrate 306 (outside substrate portion 306N) in the x-dimension. As mentioned above, an as shown in FIG. 3C, adjacent diffusion regions are diffusion regions located immediately one next to another. Diffusion regions 371p through 379p can form respective sources $P_1$ through $P_4$, and drains $P_1'$ through $P_4'$ of transistors MP. Diffusion regions 371n through 379n can form respective sources $N_1$ through $N_4$, and drains $N_1'$ through $N_4'$ of transistors MN.

FIG. 3C also shows connections 391c directly coupled between gates G1, G2, G3, and G4 and respective diffusion regions 391p and 391n.

Gates G1 through G4 of respective inverters INV1 through INV4 have lengths extending in the y-dimension (which is perpendicular to the x-dimension). Gates G1 through G4 can be formed over substrate 306 and between diffusion regions 371p through 379p and between diffusion regions 371n through 379n.

Gates GP and GN can have lengths extending in the y-dimension. Each of gates GP can be formed over substrate 306 and between one of diffusion regions 391p and one of diffusion regions 371p through 379p. Each of gates GN can be formed over substrate 306 and between one of diffusion regions 391n and one of diffusion regions 371n through 379n. Gates GP and GN can include the same materials as gates G1 through G4. Diffusion regions 391p can include the same materials (e.g., materials having p-type conductivity) as diffusion regions 371p through 379p. Diffusion regions 391n can include the same materials (e.g., materials having n-type conductivity) as diffusion regions 371n through 379n.

Gates GP and GN, and diffusion regions 391p and 391n, may not be parts of transistors MP and MN. Gates GP and GN may be called "dummy" gates. Diffusion regions 391p and 391n may be called "dummy" diffusion regions. Gates GP and GN, and diffusion regions 391p and 391n, are formed to help protect driver circuit 305 from photonic emission attacks, as described in more detail below. FIG. 3D shows a side view (cross-sectional view) of driver circuit 305 taken along line 3D-3D of FIG. 3C, FIG. 3E shows a side view (cross-sectional view) of driver circuit 305 taken along line 3E-3E of FIG. 3C. Detailed description of FIG. 3C is provided below after the description of FIG. 3D and FIG. 3E.

As shown in FIG. 3D, diffusion regions 371p through 379p, and 391p, are regions inside substrate portion 306N of substrate 306 that can be doped with impurities of p-type. Thus, diffusion regions 371p through 379p, and 391p, can include materials of p-type conductivity. Diffusion regions 371p through 379p can form sources ($P_1$ through $P_4$) and drains ($P_1'$ through $P_4'$) of transistors MP of inverters INV1 through INV4.

Each of inverters INV1 through INV4 can include two adjacent diffusion regions among diffusion regions 371p through 379p (that form transistor MP of the inverter). For example, inverter INV1 includes diffusion regions 371p and 372p that form source $P_1$ and drain $P_1'$, respectively, of transistor MP of inverter INV1.

Each of gates G1 through G4 can be located over a region (e.g., a channel region) in substrate portion 306N of substrate 306 between two of diffusion regions 371p through 379p. Gates G1 through G4 can include conductive materials, such as conductively doped polysilicon, metal, or other conductive materials.

Gates GP (e.g., dummy gates) can be coupled to connection 353 to receive voltage Vcc. Diffusion regions 371p, 373p, 375p, 377p, 379p can also be coupled to connection 353 to receive voltage Vcc.

Two adjacent gates GP (two gates GP that are located immediately next to each other) are placed on both sides of each of diffusion regions 391p and are provided with voltage Vcc to prevent each of diffusion regions 391p from being electrically coupled to adjacent diffusion regions (diffusion regions that provide signal D#) during operations of driver circuit 305. For example, between diffusion regions 372p and 373p, two gates GP are placed on both sides of diffusion region 391p to prevent a conductive path (e.g., a conductive channel) forming between diffusion region 372p and diffusion region 391p (adjacent diffusion region 372p) and a conductive path (e.g., a conductive channel) forming between diffusion region 373p and diffusion region 391p (adjacent diffusion region 373p).

In FIG. 3E, diffusion regions 371n through 379n are regions in substrate 306 (outside substrate portion 306N of FIG. 3D) that can be doped with impurity of n-type conductivity. Thus, diffusion regions 371n through 379n can include materials of n-type conductivity. Diffusion regions 371n through 379n can form sources ($N_1$ through $N_4$) and drains ($N_1'$ through $N_4'$) of the transistors MN of inverters INV1 through INV4.

Each of inverters INV1 through INV4 can include two adjacent diffusion regions among diffusion regions 371n through 379n (that form transistor MN of the inverter). For example, inverter INV1 includes diffusion regions 371n and 372n that form source $N_1$ and drain $N_1'$, respectively, of transistor MN of inverter INV1.

Gates G1 through G4 are the same as gates G1 through G4 in FIG. 3D. As shown in FIG. 3E, each of gates G1 through G4 can be located over a region (e.g., a channel region) of substrate 306 between two of diffusion regions 371n through 379n.

Gates GN (e.g., dummy gates) can be coupled to connection 363 to receive voltage Vss. Diffusion regions 371n, 373n, 375n, 377n, 379n can be coupled to connection 363 to receive voltage Vcc.

Two adjacent gates GN (two gates GN that are located immediately next to each other) are placed on both sides of each of diffusion regions 391n and are provided with voltage Vss to prevent each of diffusion regions 391n from being electrically coupled to adjacent diffusion regions (diffusion regions that provide signal D#) during operations of driver circuit 305. For example, between diffusion regions 372n and 373n, two gates GN are placed on both sides of diffusion region 391n to prevent a conductive path (e.g., a conductive channel) forming between diffusion region 372n and diffusion region 391n (adjacent diffusion region 372n) and a conductive path (e.g., a conductive channel) forming between diffusion region 373n and diffusion region 391n (adjacent diffusion region 373n).

In FIG. 3D and FIG. 3E, signals D and D# at respective diffusion regions 371p through 379p and 371n through 379n and gates G1 through G4 are the same as those shown in FIG. 3B and FIG. 3C. Connections 350, 351, 352, 353, and 363 in FIG. 3D and FIG. 3E are also the same as those shown in FIG. 3B. Connections 350, 351, 352, 353, and 363 can be formed over substrate 306 and can include conductive material (e.g., conductively doped polysilicon, metal (e.g., metal lines), or other conductive materials). Connections 350, 351, 352, 353, and 363 can be coupled to respective diffusion regions 371$p$ through 379$p$ and 371$n$ through 379$n$ and gates G1 through G4 in ways shown in FIG. 3D and FIG. 3E. Connections 391$c$ (coupled between gates G1, G2, G3, and G4 and diffusion regions 391$p$ and 391$n$) can be part of connection 350 (associated with signal D).

FIG. 3C shows signal-level switching activity (e.g., transient activity) of signal D# at diffusion regions 372$p$, 374$p$, 376$p$, 378$p$, 372$n$, 374$n$, 376$n$, and 378$n$. FIG. 3C also shows signal D at gates G1 through G4 and at diffusion regions 391$p$ and 391$n$. In operation, when signal D switches from one level to another level, signal D# switches between different levels in a direction that is opposite from that of signal D. For example, when signal D switches from a level corresponding to voltage V1 to a level corresponding to voltage V0, signals D# switches from a level corresponding to voltage V0 to a level corresponding to voltage V1.

FIG. 3C also shows states (e.g., static states) "0" (logic 0) and "1" (logic 1) at respective diffusion regions 372$p$ through 379$p$, 372$n$ through 379$n$, 391$p$, and 391$n$ when signal D switches from one level to another level. For example, when signal D switches from a level corresponding to voltage V1 to a level corresponding to voltage V0, diffusion regions 372$p$, 374$p$, 376$p$, 378$p$, 372$n$, 374$n$, 376$n$, and 378$n$ can have state "1", and diffusion regions 391$p$ and 391$n$ can have state "0", which is opposite from state "1" of diffusion regions 372$p$, 374$p$, 376$p$, 378$p$, 372$n$, 374$n$, 376$n$, and 378$n$.

Although not shown in FIG. 3C, signals D and D#0 can also switch in opposite directions in another situation different from the situation shown in the example of FIG. 3C. For example, when signal D switches from a level corresponding to voltage V0 to a level corresponding to, signal D# can switch from a level corresponding to voltage V1 to a level corresponding to voltage V0. Thus, in such a situation, diffusion regions 372$p$, 374$p$, 376$p$, 378$p$, 372$n$, 374$n$, 376$n$, and 378$n$ can have state "0", and diffusion regions 391$p$ and 391$n$ can have state "1".

Thus, as shown in FIG. 3C, diffusion regions 372$p$ through 379$p$, 372$n$ through 379$n$, 391$p$, and 391$n$ are arranged in a particular arrangement, such that each of diffusion regions (e.g., 372$p$, 374$p$, 376$p$, 378$p$, 372$n$, 374$n$, 376$n$, and 378$n$) that provide signal D# can be placed next to an adjacent diffusion region (e.g., 391$p$) that provides a signal (e.g., signal D) having a value complementary to the value of signal D#. For example, when signal D (at each of diffusion regions 391$p$ and 391$n$) switches levels in a direction from a level corresponding to voltage V1 to a level corresponding to voltage V0, signal D# (at each of diffusion regions 372$p$, 374$p$, 376$p$, 378$p$, 372$n$, 374$n$, 376$n$, and 378$n$) switches levels in an opposite direction from a level corresponding to voltage V0 to a level corresponding to voltage V1.

FIG. 3F shows a top view (e.g., layout) of driver portion 305$_2$ of driver circuit 305 including diffusion regions 379$p$ through 387$p$ and 379$n$ through 387$n$, and gates G5 through G8 of inverters INV5 through INV8 of FIG. 3B, and additional diffusion regions 392$p$ and 392$n$ and additional gates GP and GN, according to some embodiments described herein. As shown in FIG. 3F, diffusion regions 379$p$ through 387$p$, and 392$p$, can be formed adjacent each other in a location of substrate 306 (inside substrate portion 306N) in the x-dimension. Diffusion regions 379$n$ through 387$n$, and 392$n$, can be formed adjacent each other in another location of substrate 306 (outside substrate portion 306N) in the x-dimension. As mentioned above, an as shown in FIG. 3F, adjacent diffusion regions are diffusion regions located immediately next to each other.

Substrate 306 in FIG. 3F is the same as substrate 306 in FIG. 3C. Substrate portion 306N in FIG. 3F can be a continuation of substrate portion 306N of FIG. 3C. Driver portion 305$_1$ (FIG. 3C) is located at one part of substrate 306 and driver portion 305$_2$ (FIG. 3C) is located at another part of substrate 306. Diffusion regions 379$p$ and 379$n$ of driver portion 305$_2$ in FIG. 3F are the same as (e.g., a continuation of) diffusion regions 379$p$ and 379$n$, respectively, of driver portion 305$_1$ in FIG. 3C.

In FIG. 3F, diffusion regions 379$p$ through 387$p$ can form respective sources $P_5$ through $P_8$ and drains $P_5'$ through $P_8'$ of transistors MP. Diffusion regions 379$n$ through 387$n$ can form respective sources $N_5$ through $N_8$ and drains $N_5'$ through $N_8'$ of transistors MN. FIG. 3F also shows connections 392$c$ directly coupled between gates G5, G6, G7, and G8 and respective diffusion regions 392$p$ and 392$n$. Gates G5 through G8 of respective inverters INV5 through INV8 have lengths extending in the y-dimension (which is perpendicular to the x-dimension). Gates G5 through G8 can be formed over substrate 306 and between diffusion regions 379$p$ through 387$p$ and between diffusion regions 379$n$ through 387$n$.

Gates GP and GN can have lengths extending in the y-dimension. Each of gates GP can be formed over substrate 306 and between one of diffusion regions 392$p$ and one of diffusion regions 379$p$ through 387$p$. Each of gates GN can be formed over substrate 306 and between one of diffusion regions 392$n$ one of diffusion regions 379$n$ through 387$n$. Gates GP and GN can include the same materials as gates G5 through G8. Diffusion regions 392$p$ can include the same materials (e.g., materials having p-type conductivity) as diffusion regions 379$p$ through 387$p$. Diffusion regions 392$n$ can include the same materials (e.g., materials having n-type conductivity) as diffusion regions 379$n$ through 387$n$.

Similar to driver portion 305$_1$ (FIG. 3C, FIG. 3D, and FIG. 3E), gates GP and GN of driver portion 305$_2$ (FIG. 3F) and diffusion regions 392$p$ and 392$n$ (FIG. 3F) may not be parts of transistors MP and MN. Gates GP and GN of driver portion 305$_1$ may be called "dummy" gates. Diffusion regions 392$p$ and 392$n$ may be called "dummy" diffusion regions. Gates GP and GN, and diffusion regions 391$p$ and 391$n$, are formed to help protect driver circuit 305 from photonic emission attacks, as described in more detail below with reference to FIG. 3G and FIG. 3H. FIG. 3G shows a side view (cross-sectional view) of driver circuit 305 taken along line 3G-3G of FIG. 3F. FIG. 3H shows a side view (cross-sectional view) of driver circuit 305 taken along line 3H-3H of FIG. 3F. Detailed description of FIG. 3F is provided below after the description of FIG. 3G and FIG. 3H.

As shown in FIG. 3G, diffusion regions 379$p$ through 387$p$, and 392$p$, are regions inside substrate portion 306N of substrate 306 that can be doped with impurities of p-type. Thus, diffusion regions 379$p$ through 387$p$, and 392$p$, can include materials of p-type conductivity. Diffusion regions 379$p$ through 387$p$ can form respective sources ($P_5$ through $P_8$) and drains ($P'_5$ through $P'_8$) of transistors MP of inverters INV5 through INV8.

Each of inverters INV5 through INV8 can include two adjacent diffusion regions among diffusion regions 379p through 387p (that form transistor MP of the inverter). For example, inverter INV5 includes diffusion regions 379p and 380p that form source $P_5$ and drain $P'_5$, respectively, of transistor MP of inverter INV5.

Each of gates G5 through G8 can be located over a region (e.g., a channel region) inside substrate portion 306N of substrate 306 between two of diffusion regions 379p through 387p. Gates G5 through G8 can include conductive materials, such as conductively doped polysilicon, metal, or other conductive materials.

Gates GP (e.g., dummy gates) can be coupled to connection 353 to receive voltage Vcc. Diffusion regions 379p, 381p, 383p, 385p, 387p can be coupled to connection 353 to receive voltage Vcc.

Two adjacent gates GP (two gates GP that are located immediately next to each other) are placed on both sides of each of diffusion regions 392p and are provided with a voltage Vcc to prevent each of diffusion regions 392p from being electrically coupled to adjacent diffusion regions (diffusion regions that provide signal D#) during operations of driver circuit 305. For example, between diffusion regions 380p and 381p, two gates GP are placed on both sides of diffusion region 392p to prevent a conductive path (e.g., a conductive channel) forming between diffusion region 380p and diffusion region 392p (adjacent diffusion region 380p) and a conductive path (e.g., a conductive channel) forming between diffusion region 381p and diffusion region 392p (adjacent diffusion region 381p).

In FIG. 3H, diffusion regions 379n through 387n are regions in substrate 306 (outside substrate portion 306N of FIG. 3G) that can be doped with impurity of n-type conductivity. Thus, diffusion regions 379n through 387n can include materials of n-type conductivity. Diffusion regions 379n through 387n can form sources ($N_5$ through $N_8$) and drains ($N'_5$ through $N'_8$) of the transistors MN of inverters INV5 through INV8.

Each of inverters INV5 through INV8 can include two adjacent diffusion regions among diffusion regions 379n through 387n (that form transistor MN of the inverter). For example, inverter INV5 includes diffusion regions 379n and 380n that form source $N_5$ and drain $N'_5$, respectively, of transistor MN of inverter INV5.

Gates G5 through G8 are the same as gates G5 through G8 in FIG. 3G. As shown in FIG. 3H, each of gates G5 through G8 can be located over a region (e.g., a channel region) of substrate 306 between two of diffusion regions 379n through 387n.

Gates GN (e.g., dummy gates) can be coupled to connection 363 to receive voltage Vss. Diffusion regions 379n, 381n, 383n, 385n, 387n can be coupled to connection 363 to receive voltage Vss.

Two adjacent gates GN (two gates GN that are located immediately next to each other) are placed on both sides of each of diffusion regions 392n and are provided with a voltage Vss to prevent each of diffusion regions 392n from being electrically coupled to adjacent diffusion regions (diffusion regions that provide signal D##) during operations of driver circuit 305. For example, between diffusion regions 380n and 381n, two gates GN are placed on both sides of diffusion region 392n to prevent a conductive path (e.g., a conductive channel) forming between diffusion region 380n and diffusion region 392n (adjacent diffusion region 380n) and a conductive path (e.g., a conductive channel) forming between diffusion region 381n and diffusion region 392n (adjacent diffusion region 381n).

In FIG. 3G and FIG. 3H, signals D# and D## at respective diffusion regions 379p through 387p and 379n through 387n and gates G5 through G8 are the same as those shown in FIG. 3B and FIG. 3F. Connections 350, 351, 352, 353, and 363 in FIG. 3G and FIG. 3H are also the same as those shown in FIG. 3B. Connections 350, 351, 352, 353, and 363 can be formed over substrate 306 and can include conductive material (e.g., conductively doped polysilicon, metal (e.g., metal lines), or other conductive materials). Connections 350, 351, 352, 353, and 363 can be coupled to respective diffusion regions 379p through 387p and 379n through 387n and gates G5 through G8 in ways shown in FIG. 3G and FIG. 3H. Connections 392c (coupled between gates G5, G6, G7, and G8 and diffusion regions 392p and 392n) can be part of connection 351 (associated with signal D#).

FIG. 3F shows signal level-switching activity (e.g., transient activity) of signal D## at diffusion regions 380p, 382p, 384p, 386p, 380n, 382n, 384n, and 386n. FIG. 3F also shows signal D# at gates G5 through G8 and at diffusion regions 392p and 392n. In operation, when signal D# switches from one level to another level, signal D## switches between different levels in a direction that is opposite from that of signal D#. For example, when signal D# switches from a level corresponding to voltage V1 to a level corresponding to voltage V0, signal D## switches from a level corresponding to voltage V0 to a level corresponding to voltage V1.

FIG. 3F also shows states (e.g., static states) "0" (logic 0) and "1" (logic 1) at respective diffusion regions 380p through 387p, 380n through 387n, 392p, and 392n when signal D# switches from one level to another level. For example, when signal D# switches from a level corresponding to voltage V1 to a level corresponding to voltage V0, diffusion regions 380p, 382p, 384p, 386p, 380n, 382n, 384n, and 386n can have state "1", and diffusion regions 392p and 392n can have state "0", which is opposite from state "1" of diffusion regions 380p, 382p, 384p, 386p, 380n, 382n, 384n, and 386n.

Although not shown in FIG. 3F, signals D# and D## can also switch in opposite directions in another situation different from the situation shown in the example of FIG. 3F. For example, when signal D# switches from a level corresponding to voltage V0 to a level corresponding to voltage V1, signal D## can switch from a level corresponding to voltage V1 to a level corresponding to voltage V0. Thus, in such a situation, diffusion regions 380p, 382p, 384p, 386p, 380n, 382n, 384n, and 386n can have state "0", and diffusion regions 392p and 392n can have state "1".

Thus, as shown in FIG. 3F, diffusion regions 379p through 387p, and 392p, are arranged in a particular arrangement, such that each of diffusion regions (e.g., 380p, 382p, 384p, 386p, 380n, 382n, 384n, and 386n) that provide signal D## can be placed next to an adjacent diffusion region (e.g., 392p) that provides a signal (e.g., signal D#) having a value complementary to the value of signal D##. For example, when signal D# (at each of diffusion regions 392p and 392n) switches levels in a direction from a level corresponding to voltage V1 to a level corresponding to voltage V0, signal D## (at each of diffusion regions 380p, 380n, 382p, 382n, 384p, 384n, 386p, and 386n) switches levels in an opposite direction from a level corresponding to voltage V0 to a level corresponding to voltage V1.

Driver circuit 305 (FIG. 3C through FIG. 3H) may have a higher resistance against photonic emission attacks than some conventional driver circuits. For example, as mentioned above, some conventional driver circuits may have structures where signal transient behavior and static activity may cause the conventional driver circuits to be vulnerable to photonic emission attacks.

In driver circuit 305, the arrangement of diffusion regions 372$p$ through 379$n$, 372$n$ through 379$n$, 391$p$, and 391$n$ (FIG. 3C, FIG. 3D, and FIG. 3E); and diffusion regions 379$p$ through 387$p$, 379$n$ through 387$n$, 392$p$, and 392$n$ (FIG. 3F, FIG. 3G, and FIG. 3H) allow signals (D# and D in FIG. 3C, and D# and D## in FIG. 3F) of adjacent diffusion regions (that provide signals D, D#, and D##) to have complementary behavior (e.g., switch in opposite directions). The arrangement of these diffusion regions (shown in FIG. 3C through FIG. 3H) of driver circuit 305 also allows the states (e.g., static states) of these diffusion regions to have opposite values (e.g., at V1 Vcc) and V0 (e.g., Vss)). Thus, photon emission from driver circuit 305 can be averaged (due to the arrangement of diffusion regions shown in FIG. 3C through FIG. 3H). This may make analysis of photon emission from driver circuit 305 difficult. For example, it may be difficult to analyze photon emission from driver circuit 305 if the photon emission is sensed by a photon sensor having a large aperture (e.g., relative to the transistor pitch of driver circuit 305). Thus, any confidential information (e.g., encryption/decryption keys) propagated by driver circuit 305 may be hard to reconstruct. Therefore, as described above, the structures (e.g., the arrangement of the diffusion regions) of driver circuit 305 may allow it to be less vulnerable to photonic emission attacks in comparison to some conventional driver circuits.

In comparison with driver circuit 205 (FIG. 2C), the size of driver circuit 305 may be larger. However, the average photon emission of driver circuit 305 may be tighter than that of driver circuit 205. As shown in FIG. 2C, the diffusion regions that provide complementary signals D# and D## (e.g., diffusion regions 272$p$ and 274$p$) are separated from each other by two gates G1 and G2 (e.g., a two gate-poly pitch). In FIG. 3C and FIG. 3F, the diffusion regions that provide complementary signals are separated from each other by one gate GP (e.g., one gate-poly pitch), such as diffusion region 372$p$ that has signal D#, and adjacent diffusion region 391$p$ that has signal D in FIG. 3C, or diffusion region 380$p$ that has signal D##, and adjacent diffusion region 392$p$ that has signal D# in FIG. 3F. The smaller pitch in driver circuit 305 may allow it to have a tighter average (e.g., tighter blending of) photon emission than that of driver circuit 205. This may allow driver circuit 305 to have a higher resistance against photonic emission attacks than driver circuit 205.

Thus, as described above with reference to FIG. 2A through FIG. 3H, the arrangement of the diffusion regions of driver circuits 205 and 305 help protect them from photonic emission attacks. This may improve (e.g., increase) photonic emission attack resistance of the device or system that includes driver circuit 205 or 305. Therefore, any confidential information (e.g., encryption/decryption keys) used by or stored in such device or system can be protected.

FIG. 4 shows an apparatus in the form of a system (e.g., electronic system) 400, according to some embodiments described herein. System 400 can include or be included in a mobile device, a wearable product, a computer, a tablet, or other electronic device or system. As shown in FIG. 4, system 400 can include components located on a circuit board (e.g., printed circuit board (PCB)) 402, such as a processor 415, a memory device 420, a memory controller 430, a graphics controller 440, an I/O controller 450, a display 452, a keyboard 454, a pointing device 456, at least one antenna 458, a connector 455, and a bus (e.g., on-board bus) 460. Bus 460 can include conductive lines (e.g., metal-based traces on a circuit board (e.g., a printed circuit board (PCB) where the components of system 400 are located).

In some arrangements, system 400 does not have to include a display. Thus, display 452 can be omitted from system 400. In some arrangements, system 400 does not have to include any antenna. Thus, antenna 458 can be omitted from system 400. In some arrangements, system 400 does not have to include a connector. Thus, connector 455 can be omitted from system 400.

Processor 415 can include a general-purpose processor or an application-specific integrated circuit (ASIC). Processor 415 can include a CPU.

Memory device 420 can include a dynamic random access memory (DRAM) device, a static random access memory (SRAM) device, a flash memory device, phase change memory, a combination of these memory devices, or other types of memory. FIG. 4 shows an example where memory device 420 is a stand-alone memory device separated from processor 415. In an alternative arrangement, memory device 420 and processor 415 can be located on the same die. In such an alternative arrangement, memory device 420 is an embedded memory in processor 415, such as embedded DRAM (DRAM), embedded SRAM (eSRAM), embedded flash memory, or another type of embedded memory.

Display 452 can include a liquid crystal display (LCD), a touchscreen (e.g., capacitive or resistive touchscreen), or another type of display. Pointing device 456 can include a mouse, a stylus, or another type of pointing device.

I/O controller 450 can include a communication module for wired or wireless communication (e.g., communication through one or more antenna 458). Such wireless communication may include communication in accordance with WiFi communication technique, Long Term Evolution Advanced (LTE-A) communication technique, or other communication techniques.

I/O controller 450 can also include a module to allow system 400 to communicate with other devices or systems in accordance with to one or more of the following standards or specifications (e.g., I/O standards or specifications), including Universal Serial Bus (USB), DisplayPort, (DP), High-Definition Multimedia Interface (HDMI), Thunderbolt, Peripheral Component Interconnect Express (PCIe), Ethernet, and other specifications.

Connector 455 can be arranged (e.g., can include terminals, such as pins) to allow system 400 to be coupled to an external device (or system). This may allow system 400 to communicate (e.g., exchange information) with such a device (or system) through connector 455. Connector 455 and at least a portion of bus 460 can include conductive lines that conform with at least one of USB, DP, HDMI, Thunderbolt, PCIe, Ethernet, and other specifications.

As shown in FIG. 4, each of processor 415, memory device 420, memory controller 430, graphics controller 440, and I/O controller 450 can include functional units 401 and 402, and a bus (e.g., on-chip or on-die bus) 403. Bus 403 can include any of the driver circuits (e.g., 105, 205, and 305) described above with reference to FIG. 1 through FIG. 3H. FIG. 4 shows each of processor 415, memory device 420, memory controller 430, graphics controller 440, and I/O controller 450 including functional units 401 and 402, and bus 403, as an example. However, fewer than all of processor 415, memory device 420, memory controller 430, graphics controller 440, and I/O controller 450 can include all of functional units 401 and 402, and bus 403.

FIG. 4 shows the components of system 400 arranged separately from each other as an example. For example, each of processor 415, memory device 420, memory controller 430, graphics controller 440, and I/O controller 450 can be located on a separate IC (e.g., semiconductor die or an IC chip). In some arrangements, two or more components (e.g., processor 415, memory device 420, graphics controller 440, and I/O controller 450) of system 400 can be located on the same die (e.g., same IC chip) that forms a system-on-chip.

The illustrations of the apparatuses (e.g., apparatus 100 and system 400 including driver circuits 105, 205, and 405) and methods (e.g., operations of apparatus 100 and system 400 including operations of driver circuits 105, 205, and 405) described above are intended to provide a general understanding of the structure of different embodiments and are not intended to provide a complete description of all the elements and features of an apparatus that might make use of the structures described herein.

Additional Notes and Examples

Example 1 includes subject matter (such as a device, an electronic apparatus (e.g., circuit, electronic system, or both), or a machine) including diffusion regions located adjacent each other in a substrate, the diffusion regions including first diffusion regions, second diffusion regions, and third diffusion regions, wherein one of the second diffusion regions and one of the third diffusion regions are between two of the first diffusion regions, and one of the first diffusion regions and one of the third diffusion regions are between two of the second diffusion regions, a first connection coupled to each of the first diffusion regions, a second connection coupled to each of the second diffusion regions, and a third connection coupled to each of the third diffusion regions.

In Example 2, the subject matter of Example 1 may optionally include, wherein the diffusion regions include materials of p-type conductivity.

In Example 3, the subject matter of Example 1 may optionally include, wherein the diffusion regions include materials of n-type conductivity.

In Example 4, the subject matter of Example 1 may optionally include, wherein the third connection is coupled to a supply node.

In Example 5, the subject matter of Example 1 may optionally include, wherein

In Example 6, the subject matter of any of Examples 1-5 may optionally include, wherein the third connection is coupled to a ground node.

In Example 7, the subject matter of Example 6 may optionally include, wherein the gates include a gate coupled to a supply node.

In Example 8, the subject matter of Example 6 may optionally include, wherein the gates include a gate coupled to a ground node.

In Example 9, the subject matter of Example 1 may optionally include, further comprising additional diffusion regions located adjacent each other in the substrate, the additional diffusion regions including first additional diffusion regions, second additional diffusion regions, and third additional diffusion regions, wherein one of the second additional diffusion regions and one of the third additional diffusion regions are between two of the first additional diffusion regions, and one of the first additional diffusion regions and one of the third additional diffusion regions are between two of the second additional diffusion regions, wherein the first connection is coupled to each of the first additional diffusion regions, the second is connection coupled to each of the second additional diffusion regions, and a fourth connection is coupled to each of the third additional diffusion regions, wherein the diffusion regions include materials of a first type of conductivity, and the additional diffusion regions include materials of a second type of conductivity.

In Example 10, the subject matter of Example 9 may optionally include, wherein the third connection is coupled to a supply node and the fourth connection is coupled to a ground node.

Example 11 includes subject matter (such as a device, an electronic apparatus (e.g., circuit, electronic system, or both), or a machine) including a node to receive an input signal, diffusion regions located adjacent each other in a substrate, the diffusion regions including first diffusion regions and second diffusion regions, wherein one of the first diffusion regions is between two of the second diffusion regions, and one of the second diffusion regions is between two of the first diffusion regions, and connections coupled to the node and the diffusion regions to allow a first signal at each of the first diffusion regions and a second signal at each of the second diffusion regions to switch in opposite directions when the input signal switches between different levels.

In Example 12, the subject matter of Example 11 may optionally include, wherein the connections are coupled to the node and the diffusion regions to allow the first signal to switch in a direction from a first level to a second level, the first level corresponding to a first voltage having a first value, and the second level corresponding to a second voltage having a second value greater than the first value.

In Example 13, the subject matter of any of Example 9-12 may optionally include, wherein the connections are coupled to the node and the diffusion regions to allow the first signal to switch in a direction from a first level to a second level, the first level corresponding to a first voltage having a first value, and the second level corresponding to a second voltage having a second value less than the first value.

In Example 14, the subject matter of any Examples 11-13 may optionally include, further comprising gates located over the substrate, wherein the gates include at least one gate coupled to one of the second diffusion regions through the connections.

In Example 15, the subject matter of Example 14 may optionally include, wherein two adjacent gates of the gates are coupled to a supply node.

In Example 16, the subject matter of Example 14 may optionally include, wherein two adjacent gates of the gates are coupled to a ground node.

In Example 17, the subject matter of Example 11 may optionally include, further comprising additional diffusion regions located adjacent each other in the substrate, the additional diffusion regions including first additional diffusion regions and second additional diffusion regions, wherein one of first additional diffusion regions is between two of the second additional diffusion regions, and one of the second additional diffusion regions is between two of the first additional diffusion regions, and the connections are coupled to the additional diffusion regions to allow a first additional signal at each of the first additional diffusion regions and a second additional signal at each of the second additional diffusion regions to switch in opposite directions when the input signal switches between the different levels.

Example 18 includes subject matter (such as a device, an electronic apparatus (e.g., circuit, electronic system, or both), or a machine) a processor core located at a semiconductor substrate, an encryption engine located at the semiconductor substrate, and a bus located at the semiconductor substrate and coupled to the processor and the encryption engine, the bus including a driver circuit, the driver circuit including diffusion regions located adjacent each other in the substrate, the diffusion regions including first diffusion regions, second diffusion regions, and third diffusion regions, wherein one of the second diffusion regions and one of the third diffusion regions are between two of the first diffusion regions, and one of the first diffusion regions and one of the third diffusion regions are between two of the second diffusion regions, a first connection coupled to each of the first diffusion regions, a second connection coupled to each of the second diffusion regions, and a third connection coupled to each of the third diffusion regions.

In Example 19, the subject matter of Example 18 may optionally include, further comprising additional diffusion regions located adjacent each other in the substrate, the additional diffusion regions including first additional diffusion regions, second additional diffusion regions, and third additional diffusion regions, wherein one of the additional second diffusion regions and one of the additional third diffusion regions are between two of the additional first diffusion regions, and one of the first additional diffusion regions and one of the third additional diffusion regions are between two of the second additional diffusion regions, wherein the first connection is coupled to each of the first additional diffusion regions, the second connection coupled to each of the second additional diffusion regions, and a fourth connection coupled to each of the third additional diffusion regions, wherein the diffusion regions include materials of a first type of conductivity, and the additional diffusion regions include materials of a second type of conductivity.

In Example 20, the subject matter of Example 18 may optionally include, further comprising a connector coupled to the processor, the connector conforming with one of Universal Serial Bus (USB), High-Definition Multimedia Interface (HDMI), Thunderbolt, and Peripheral Component Interconnect Express (PCIe).

Example 21 includes subject matter (such as a method of operating a device, an electronic apparatus (e.g., circuit, electronic system, or both), or a machine) including propagating an input signal from an input node to first diffusion regions of a driver circuit of a bus of a device, and propagating a signal from the first diffusion regions to second diffusion regions of the driver circuit, the first diffusion regions and second diffusion regions arranged with the first diffusion regions such that one of first diffusion regions is between two of the second diffusion regions, and one of the second diffusion regions is between two of the first diffusion regions, the driver circuit including connections coupled the first diffusion regions and the second diffusion such that when the input signal switches between different levels in a first direction, the signal at each of the first diffusion regions switches between different levels in a second direction, and a signal at each of the second diffusion regions switches between different levels in the first direction.

In Example 22, the subject matter of Example 21 may optionally include, wherein the first direction includes a direction from a first level of the input signal to a second level of the input signal, the first level corresponding to a first voltage having a first value, and the second level corresponding to a second voltage having a second value greater than the first value.

In Example 23, the subject matter of Example 21 may optionally include, wherein the first direction includes a direction from a first level of the input signal to a second level of the input signal, the first level corresponding to a first voltage having a first value, and the second level corresponding to a second voltage having a second value less than the first value.

In Example 24, the subject matter of Example 21 may optionally include, further comprising transmitting the input signal from a processing core of the device to the input node.

In Example 25, the subject matter of Example 21 may optionally include, further comprising transmitting the signal at each of the second diffusion regions to an encryption engine of the device.

Example 26 includes subject matter (such as a device, an electronic apparatus (e.g., circuit, electronic system, or both), or machine) including means for performing any of the methods of claims 21-25.

The subject matter of Example 1 through Example 25 may be combined in any combination.

The above description and the drawings illustrate some embodiments to enable those skilled in the art to practice the embodiments of the invention. Other embodiments may incorporate structural, logical, electrical, process, and other changes. Examples merely typify possible variations. Portions and features of some embodiments may be included in, or substituted for, those of other embodiments. Many other embodiments will be apparent to those of skill in the art upon reading and understanding the above description. Therefore, the scope of various embodiments is determined by the appended claims, along with the full range of equivalents to which such claims are entitled.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus comprising:
   diffusion regions located adjacent each other in a substrate, the diffusion regions including first diffusion regions, second diffusion regions, and third diffusion regions, wherein one of the second diffusion regions and one of the third diffusion regions are between two of the first diffusion regions, and one of the first diffusion regions and one of the third diffusion regions are between two of the second diffusion regions, wherein the first, second, and third diffusion regions have a same conductivity type;
   a first connection coupled to each of the first diffusion regions;
   a second connection coupled to each of the second diffusion regions; and
   a third connection coupled to each of the third diffusion regions.

2. The apparatus of claim 1, wherein the diffusion regions include materials of p-type conductivity.

3. The apparatus of claim 1, wherein the diffusion regions include materials of n-type conductivity.

4. The apparatus of claim 1, wherein the third connection is coupled to a supply node.

5. The apparatus of claim 1, wherein the third connection is coupled to a ground node.

6. The apparatus of claim 1, further comprising gates located over the substrate, wherein the gates include at least one gate coupled to one of the second diffusion regions through one of the first, second, and third connections.

7. The apparatus of claim 6, wherein the gates include a gate coupled to a supply node.

8. The apparatus of claim 6, wherein the gates include a gate coupled to a ground node.

9. An apparatus comprising:
a node to receive an input signal;
diffusion regions located adjacent each other in a substrate, the diffusion regions including first diffusion regions and second diffusion regions, wherein one of the first diffusion regions is between two of the second diffusion regions, and one of the second diffusion regions is between two of the first diffusion regions; and
connections coupled to the node and the diffusion regions to allow a first signal at each of the first diffusion regions and a second signal at each of the second diffusion regions to switch in opposite directions when the input signal switches between different levels.

10. An apparatus comprising:
diffusion regions located adjacent each other in a substrate, the diffusion regions including first diffusion regions, second diffusion regions, and third diffusion regions, wherein one of the second diffusion regions and one of the third diffusion regions are between two of the first diffusion regions, and one of the first diffusion regions and one of the third diffusion regions are between two of the second diffusion regions;
a first connection coupled to each of the first diffusion regions;
a second connection coupled to each of the second diffusion regions;
a third connection coupled to each of the third diffusion regions;
additional diffusion regions located adjacent each other in the substrate, the additional diffusion regions including first additional diffusion regions, second additional diffusion regions, and third additional diffusion regions, wherein one of the second additional diffusion regions and one of the third additional diffusion regions are between two of the first additional diffusion regions, and one of the first additional diffusion regions and one of the third additional diffusion regions are between two of the second additional diffusion regions, wherein:
the first connection is coupled to each of the first additional diffusion regions;
the second is connection coupled to each of the second additional diffusion regions; and
a fourth connection is coupled to each of the third additional diffusion regions, wherein the diffusion regions include materials of a first type of conductivity, and the additional diffusion regions include materials of a second type of conductivity.

11. The apparatus of claim 10, wherein the third connection is coupled to a supply node and the fourth connection is coupled to a ground node.

12. The apparatus of claim 9, further comprising:
additional diffusion regions located adjacent each other in the substrate, the additional diffusion regions including first additional diffusion regions and second additional diffusion regions, wherein one of first additional diffusion regions is between two of the second additional diffusion regions, and one of the second additional diffusion regions is between two of the first additional diffusion regions, and the connections are coupled to the additional diffusion regions to allow a first additional signal at each of the first additional diffusion regions and a second additional signal at each of the second additional diffusion regions to switch in opposite directions when the input signal switches between the different levels.

13. The apparatus of claim 9, wherein the connections are coupled to the node and the diffusion regions to allow the first signal to switch in a direction from a first level to a second level, the first level corresponding to a first voltage having a first value, and the second level corresponding to a second voltage having a second value greater than the first value.

14. The apparatus of claim 9, wherein the connections are coupled to the node and the diffusion regions to allow the first signal to switch in a direction from a first level to a second level, the first level corresponding to a first voltage having a first value, and the second level corresponding to a second voltage having a second value less than the first value.

15. The apparatus of claim 9, further comprising gates located over the substrate, wherein the gates include at least one gate coupled to one of the second diffusion regions through the connections.

16. The apparatus of claim 15, wherein two adjacent gates of the gates are coupled to a supply node.

17. The apparatus of claim 15, wherein two adjacent gates of the gates are coupled to a ground node.

18. An apparatus comprising:
a processor core located at a semiconductor substrate;
an encryption engine located at the semiconductor substrate; and
a bus located at the semiconductor substrate and coupled to the processor and the encryption engine, the bus including a driver circuit, the driver circuit including:
diffusion regions located adjacent each other in the substrate, the diffusion regions including first diffusion regions, second diffusion regions, and third diffusion regions, wherein one of the second diffusion regions and one of the third diffusion regions are between two of the first diffusion regions, and one of the first diffusion regions and one of the third diffusion regions are between two of the second diffusion regions;
a first connection coupled to each of the first diffusion regions;
a second connection coupled to each of the second diffusion regions;
a third connection coupled to each of the third diffusion regions;
additional diffusion regions located adjacent each other in the substrate, the additional diffusion regions including first additional diffusion regions, second additional diffusion regions, and third additional diffusion regions, wherein one of the additional second diffusion regions and one of the additional third diffusion regions are between two of the additional first diffusion regions, and one of the first additional diffusion regions and one of the third additional diffusion regions are between two of the second additional diffusion regions, wherein:
the first connection is coupled to each of the first additional diffusion regions;
the second connection coupled to each of the second additional diffusion regions; and
a fourth connection coupled to each of the third additional diffusion regions, wherein the diffusion regions include materials of a first type of conductivity, and the additional diffusion regions include materials of a second type of conductivity.

19. The apparatus of claim 18, further comprising a connector coupled to the processor, the connector conforming with one of Universal Serial Bus (USB), High-Definition Multimedia Interface (HDMI), Thunderbolt, and Peripheral Component Interconnect Express (PCIe).

* * * * *